United States Patent
Xu et al.

(10) Patent No.: US 12,476,572 B2
(45) Date of Patent: Nov. 18, 2025

(54) POWERTRAIN, CONTROL METHOD, AND HYBRID ELECTRIC VEHICLE

(71) Applicant: Huawei Digital Power Technologies Co., Ltd., Shenzhen (CN)

(72) Inventors: Yankun Xu, Xi'an (CN); Ningbo Feng, Xi'an (CN); Xueliang Zhang, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 231 days.

(21) Appl. No.: 18/364,666

(22) Filed: Aug. 3, 2023

(65) Prior Publication Data

US 2024/0128914 A1    Apr. 18, 2024

(30) Foreign Application Priority Data

Aug. 17, 2022    (CN) .......................... 202210989253.0

(51) Int. Cl.
*H02P 27/08*    (2006.01)
*B60L 15/00*    (2006.01)

(52) U.S. Cl.
CPC ............ *H02P 27/08* (2013.01); *B60L 15/007* (2013.01)

(58) Field of Classification Search
CPC .......... H02P 27/08; H02P 27/06; H02P 21/22; H02P 23/14; H02P 27/085; H02P 2101/45; H02P 2201/03; H02P 2201/07; H02P 2201/09; H02P 2201/11; H02P 2207/05; H02P 2207/03; H02P 2207/076; H02P 2209/01; H02P 2209/05; H02P 23/07; H02P 6/28; B60L 15/007; B60L 2200/26; B60L 58/12; B60L 2240/423; B60L 3/0046; B60L 2240/547; B60L 50/66; B60L 2210/40; B60L 58/10; B60L 50/61; B60L 2240/549; B60L 50/51; B60L 2210/10; B60L 50/60; B60L 2210/30; B60L 50/40; B60L 3/0061; B60L 2220/14; B60L 7/10; B60L 58/22; B60L 2240/443; H01M 2220/20; H01M 2004/028; H01M 2004/027; H01M 10/625; H02K 11/33; H02K 3/28; H02M 1/0009; H02M 3/07; H02M 7/5387; (Continued)

(56) References Cited

U.S. PATENT DOCUMENTS

2018/0236877 A1    8/2018    Ge et al.
2019/0047433 A1*   2/2019    Rozman ............... B60W 20/00
(Continued)

FOREIGN PATENT DOCUMENTS

CN    113752908 A    12/2021

*Primary Examiner* — Antony M Paul
(74) *Attorney, Agent, or Firm* — Maier & Maier, PLLC

(57) ABSTRACT

A powertrain, a control method, and a hybrid electric vehicle. The powertrain includes a motor controller unit and a motor. The motor controller unit includes N bridge arms, and the motor includes N motor windings corresponding to the N bridge arms. Each of the N bridge arms includes a first end and a second end, the first end of each bridge arm is connected to a positive bus, the second end of each bridge arm is connected to a negative bus, a midpoint of each bridge arm is connected to one end of one motor winding, the other end of each of the N motor windings is connected to one end of a power battery, and the other end of the power battery is connected to the positive bus or the negative bus.

20 Claims, 23 Drawing Sheets

(58) Field of Classification Search
CPC .......... H02M 3/33507; H02M 3/1582; H02M 1/0032; H02M 7/219; H02M 1/4225; H02M 7/5395; H02M 7/487
See application file for complete search history.

(56) References Cited

U.S. PATENT DOCUMENTS

2019/0084444 A1* 3/2019 Ge .......................... B60L 50/15
2019/0393821 A1* 12/2019 Ge .......................... H02P 27/08

* cited by examiner

POWERTRAIN, CONTROL METHOD, AND HYBRID ELECTRIC VEHICLE

CROSS-REFERENCE TO RELATED APPLICATION

This application claims priority to Chinese Patent Application No. 202210989253.0, filed on Aug. 17, 2022, which is hereby incorporated by reference in its entirety.

TECHNICAL FIELD

The embodiments relate to the field of new-energy vehicle technologies, a powertrain, a control method, and a hybrid electric vehicle.

BACKGROUND

Currently, a powertrain of a hybrid electric vehicle is shown in FIG. 1. The powertrain may include a generator M1, a generator control unit 100 connected to the generator M1, a bi-directional DC/DC converter 101, a motor M2, and a motor controller unit 102 connected to the motor M2.

The generator M1 is driven by an engine (which may also be referred to as an internal combustion engine). In a torque outputting process, the generator M1 may convert mechanical energy into electrical energy, provide the generated electrical energy for the motor M2, and provide the generated electrical energy for a battery BAT1 by using the bi-directional DC/DC converter 101. Alternatively, the battery BAT1 may supply power to the motor M2 by using the bi-directional DC/DC converter 101. It can be learned that the power battery BAT1 can be charged or discharge. However, the bi-directional DC/DC converter 101 needs to be used for both charging and discharging of the power battery BAT1. Therefore, in addition to the generator control unit 100 and the motor controller unit 102, the powertrain of the existing hybrid electric vehicle further includes the bi-directional DC/DC converter 101, which results in high production costs of the powertrain.

SUMMARY

The embodiments may provide a powertrain, a control method, and a hybrid electric vehicle, to reduce production costs of the powertrain.

According to a first aspect, an embodiment may provide a powertrain, where the powertrain includes a motor controller unit (MCU) and a motor, the MCU includes N bridge arms, and the motor includes N motor windings corresponding to the N bridge arms. It should be explained that the motor is in mechanical contact with a transmission system (for example, a transmission shaft), and the motor may drive a hybrid electric vehicle by using the transmission system in a torque outputting process.

A connection relationship of the powertrain may be as follows: Each of the N bridge arms includes a first end and a second end, the first end of each bridge arm is connected to a positive bus, the second end of each bridge arm is connected to a negative bus, a midpoint of each bridge arm is connected to one end of one motor winding, the other end of each of the N motor windings is connected to one end of a power battery, and the other end of the power battery is connected to the positive bus or the negative bus. Different from the prior art in which a power battery is connected to a dedicated bi-directional DC/DC converter, in this embodiment, the power battery is connected to the motor windings, and charging and discharging of the power battery are implemented by reusing the motor windings and the bridge arms. In other words, this embodiment may provide a structure of a new powertrain, so that a bi-directional DC/DC converter for charging and discharging a power battery can be saved, and production costs of the powertrain are reduced.

With reference to the first aspect, in a first possible implementation, the powertrain further includes a bus capacitor unit connected between the positive bus and the negative bus, the MCU further includes a controller, the N bridge arms include at least one first bridge arm, and the first bridge arm may be turned on or off based on a first pulse width modulation (PWM) signal. The first PWM signal may enable the bus capacitor unit to charge the power battery through a motor winding connected to the first bridge arm; or the first PWM signal may enable the power battery to discharge through a motor winding connected to the first bridge arm.

With reference to the first possible implementation of the first aspect, in a second possible implementation, the first PWM signal is determined by the controller based on a working parameter of the motor, a bus voltage, and a voltage of the power battery. The bus voltage is a voltage between the positive bus and the negative bus. The working parameter of the motor includes at least one of an input voltage, an input current, and a rotational speed of the motor. It should be noted that the input voltage of the motor may be the bus voltage.

With reference to the second possible implementation of the first aspect, in a third possible implementation, that the first PWM signal is determined by the controller based on a working parameter of the motor, a bus voltage, and a voltage of the power battery may be implemented as follows.

The first PWM signal is obtained by the controller by comparing a first modulation signal with a preset reference signal. The first modulation signal is obtained by the controller based on a second modulation signal and a preset target value, the second modulation signal is determined by the controller based on a working parameter of the motor and the bus voltage, and the preset target value is determined by the controller based on the voltage of the power battery and the bus voltage.

With reference to the third possible implementation of the first aspect, in a fourth possible implementation, when the first PWM signal enables the bus capacitor unit to charge the power battery through the motor winding connected to the first bridge arm, the first modulation signal is a sum of the second modulation signal and the preset target value.

With reference to the third possible implementation of the first aspect, in a fifth possible implementation, when the first PWM signal enables the power battery to discharge through the motor winding connected to the first bridge arm, the first modulation signal is a difference between the second modulation signal and the preset target value.

With reference to the first aspect, in a sixth possible implementation, the powertrain further includes a bus capacitor unit connected between the positive bus and the negative bus; the MCU further includes a controller; the N bridge arms include at least one second bridge arm; and the second bridge arm may be turned on or off based on a second PWM signal.

The second PWM signal may enable the bus capacitor unit to charge the power battery through a motor winding connected to the second bridge arm. In this case, the second bridge arm and the motor winding connected to the second bridge arm may implement a function of a DC/DC converter, and implement a voltage step-down function of the DC/DC converter, such as, implementing a function of a buck converter.

Alternatively, the second PWM signal may enable the power battery to discharge through a motor winding connected to the second bridge arm. In this case, the second bridge arm and the motor winding connected to the second bridge arm may implement a function of a DC/DC converter, and implement a voltage step-up function in the DC/DC converter, such as implementing a function of a boost converter.

With reference to the sixth possible implementation of the first aspect, in a seventh possible implementation, the second PWM signal is determined by the controller based on a bus voltage and a voltage of the power battery, where the bus voltage is a voltage between the positive bus and the negative bus.

With reference to the first possible implementation of the first aspect to the seventh possible implementation of the first aspect, in an eighth possible implementation, the powertrain further includes a generator control unit (Generator Control Unit, GCU) and a generator, where an input end of the GCU is connected to the generator, and an output end of the GCU is connected between the positive bus and the negative bus. Unlike the motor, the generator may be in direct mechanical contact with an internal combustion engine and may be driven by the internal combustion engine. The generator may convert mechanical energy into electrical energy and may transmit the electrical energy to the motor.

With reference to the eighth possible implementation of the first aspect, in a ninth possible implementation, when the first PWM signal enables the bus capacitor unit to charge the power battery through the motor winding connected to the first bridge arm, the GCU converts a voltage output by the generator to obtain a first voltage; and the MCU drives, based on the first voltage, the motor to output torque and charge the power battery. In this case, the first PWM signal enables the bus capacitor unit to charge the power battery through the motor winding connected to the first bridge arm, and the bus capacitor unit may provide a driving voltage for the motor. In other words, the motor outputs torque, and the power battery is in a charging state. In this case, energy stored in the bus capacitor unit may be provided by the generator, and the first bridge arm and the motor winding connected to the first bridge arm may ensure a function of a drive system of the motor, and may implement a function of a DC/AC converter. In addition, the first bridge arm and the motor winding connected to the first bridge arm may further implement a function of a DC/DC converter, and implement a voltage step-down function of the DC/DC converter, and implement a function of a buck converter. In other words, the generator drives the motor, and the generator charges the power battery.

With reference to an eighth possible implementation of the first aspect, in a tenth possible implementation, when the first PWM signal enables the power battery to discharge through the motor winding connected to the first bridge arm, the GCU is configured to convert a voltage output by the generator to obtain a second voltage; and the MCU drives, based on the second voltage and the voltage of the power battery, the motor to output torque. In this case, the first PWM signal may enable the power battery and the generator to provide a driving voltage for the motor through the motor winding connected to the first bridge arm. In other words, the motor outputs torque, and the power battery discharges. In this case, the first bridge arm and the motor winding connected to the first bridge arm may ensure a function of a drive system of the motor, and may implement a function of a DC/AC converter. In addition, the first bridge arm and the motor winding connected to the first bridge arm may implement a function of a DC/DC converter, and implement a voltage step-up function in the DC/DC converter, such as implementing a function of a boost converter. In other words, the generator and the power battery jointly drive the motor.

With reference to the sixth possible implementation of the first aspect or the seventh possible implementation of the first aspect, in an eleventh possible implementation, the powertrain further includes a GCU and a generator, where an input end of the GCU is connected to the generator, and an output end of the GCU is connected between the positive bus and the negative bus. When the second PWM signal enables the bus capacitor unit to charge the power battery through the motor winding connected to the second bridge arm, the GCU converts a voltage output by the generator to obtain a third voltage; and the MCU charges the power battery based on the third voltage. In this case, the second bridge arm and the motor winding connected to the second bridge arm may implement a function of a DC/DC converter, and implement a voltage step-down function of the DC/DC converter, such as implementing a function of a buck converter. In other words, the generator charges the power battery.

With reference to the sixth possible implementation of the first aspect or the seventh possible implementation of the first aspect, in a twelfth possible implementation, the powertrain further includes a GCU and a generator, where an input end of the GCU is connected to the generator, and an output end of the GCU is connected between the positive bus and the negative bus. When the second PWM signal enables the power battery to discharge through the motor winding connected to the second bridge arm, the MCU converts a voltage of the power battery to obtain a fourth voltage; and the GCU drives the generator based on the fourth voltage. In this case, the second bridge arm and the motor winding connected to the second bridge arm may implement a function of a DC/DC converter, and implement a voltage step-up function in the DC/DC converter, such as implementing a function of a boost converter. In other words, the power battery discharges to drive the generator.

With reference to the first aspect or with reference to any one of the foregoing possible implementations of the first aspect, in a thirteenth possible implementation, each bridge arm includes a third end, the third end of each bridge arm is connected to a neutral point of the positive bus and the negative bus, and a voltage of the neutral point is half of the voltage between the positive bus and the negative bus.

According to a second aspect, an embodiment may provide a control method of a powertrain. The powertrain includes a motor controller unit (MCU), a motor, and a bus capacitor unit connected between a positive bus and a negative bus. The MCU includes N bridge arms, where the N bridge arms include at least one first bridge arm; and the motor includes N motor windings corresponding to the N bridge arms, where N is greater than or equal to 2.

The control method may be implemented as follows: turning on or off the first bridge arm according to a first pulse width modulation (PWM) signal, so that the bus capacitor unit charges a power battery through a motor winding connected to the first bridge arm, or a power battery discharges through a motor winding connected to the first bridge arm.

With reference to the second aspect, in a first possible implementation, each of the N bridge arms includes a first end and a second end, the first end of each bridge arm is connected to the positive bus, and the second end of each bridge arm is connected to the negative bus; and before the turning on or off the first bridge arm according to a first PWM signal, the control method further includes: determining the first PWM signal based on a working parameter of the motor, a bus voltage, and a voltage of the power battery, where the bus voltage is a voltage between the positive bus and the negative bus.

With reference to the first possible implementation of the second aspect, in a second possible implementation, the determining the first PWM signal based on a working parameter of the motor, a bus voltage, and a voltage of the power battery may be implemented as follows:

obtaining a first modulation signal based on a second modulation signal and a preset target value and comparing the first modulation signal with a preset reference signal to obtain the first PWM signal. The second modulation signal is determined based on a working parameter of the motor and the bus voltage, and the preset target value is determined based on the voltage of the power battery and the bus voltage.

With reference to the second possible implementation of the second aspect, in a third possible implementation, the first modulation signal is a sum of the second modulation signal and the preset target value. In this case, the first PWM signal enables the bus capacitor unit to charge the power battery through the motor winding connected to the first bridge arm.

With reference to the second possible implementation of the second aspect, in a fourth possible implementation, the first modulation signal is a difference between the second modulation signal and the preset target value. In this case, the first PWM signal enables the power battery to discharge through the motor winding connected to the first bridge arm.

With reference to the second aspect, in a fifth possible implementation, the powertrain further includes a bus capacitor unit connected between the positive bus and the negative bus, and the N bridge arms include at least one second bridge arm.

The control method may be further implemented as follows: turning on or off the second bridge arm according to a second PWM signal, so that the bus capacitor unit charges the power battery through a motor winding connected to the second bridge arm; or the power battery discharges through a motor winding connected to the second bridge arm.

With reference to the fifth possible implementation of the second aspect, in a sixth possible implementation, before the second bridge arm is turned on or off based on the second PWM signal, the second PWM signal is determined based on a bus voltage and a voltage of the power battery, where the bus voltage is a voltage between the positive bus and the negative bus.

According to a third aspect, an embodiment may provide a hybrid electric vehicle, where the hybrid electric vehicle includes a power battery and the powertrain with reference to the first aspect or any one of the foregoing possible implementations of the first aspect. A motor in the powertrain is connected to the power battery.

It should be understood that implementation and beneficial effects of the foregoing aspects may be referred to each other.

DETAILED DESCRIPTION OF THE EMBODIMENTS

The following describes the embodiments with reference to the accompanying drawings. It is clear that the described embodiments are some but not all of the embodiments. All other embodiments obtained by a person of ordinary skill in the art without creative efforts shall fall within the scope of these embodiments.

The embodiments are further described below in detail with reference to the accompanying drawings.

Figure 1:
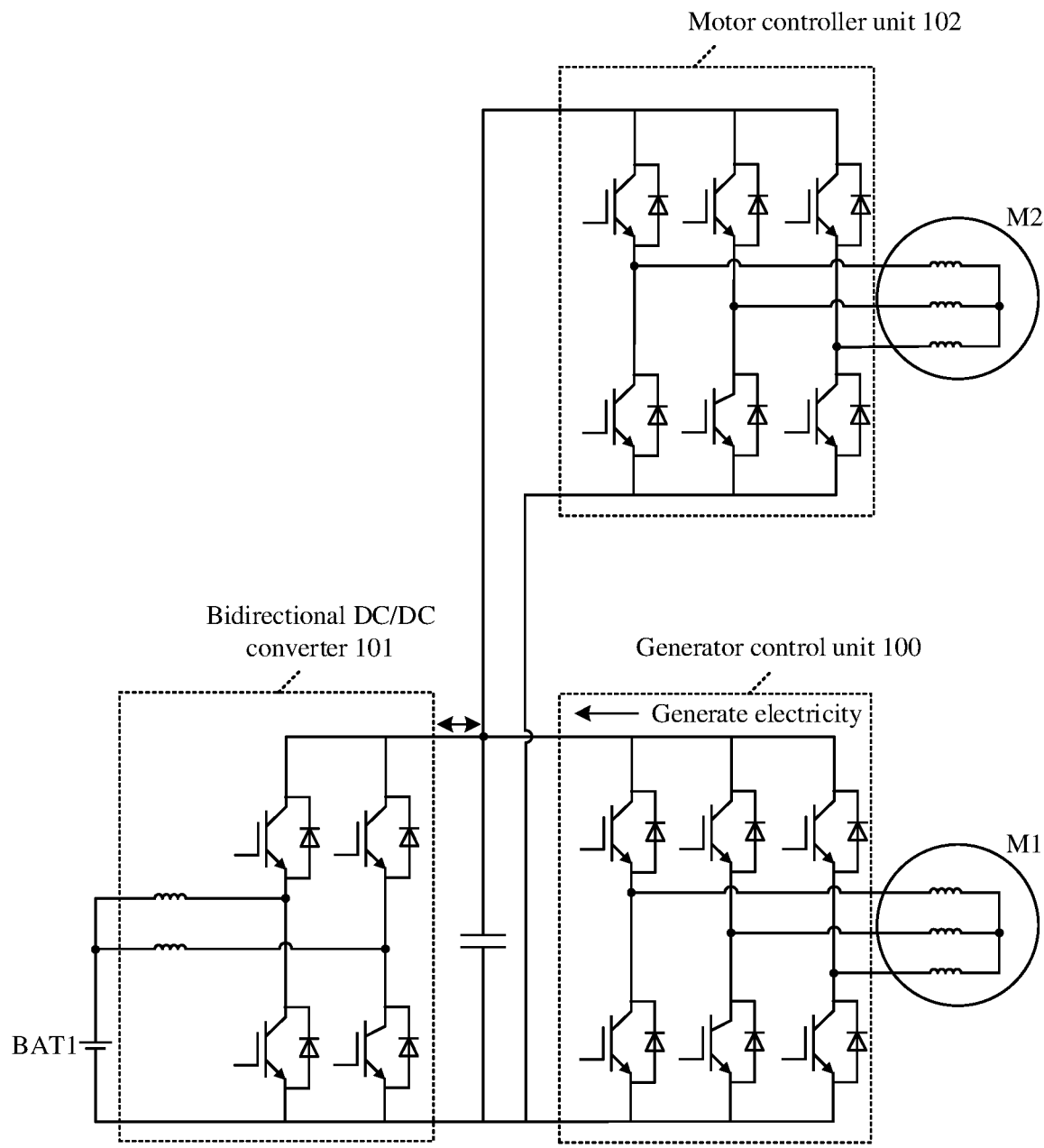
FIG. 1 is a schematic diagram of a structure of an existing powertrain.
Figure 2:
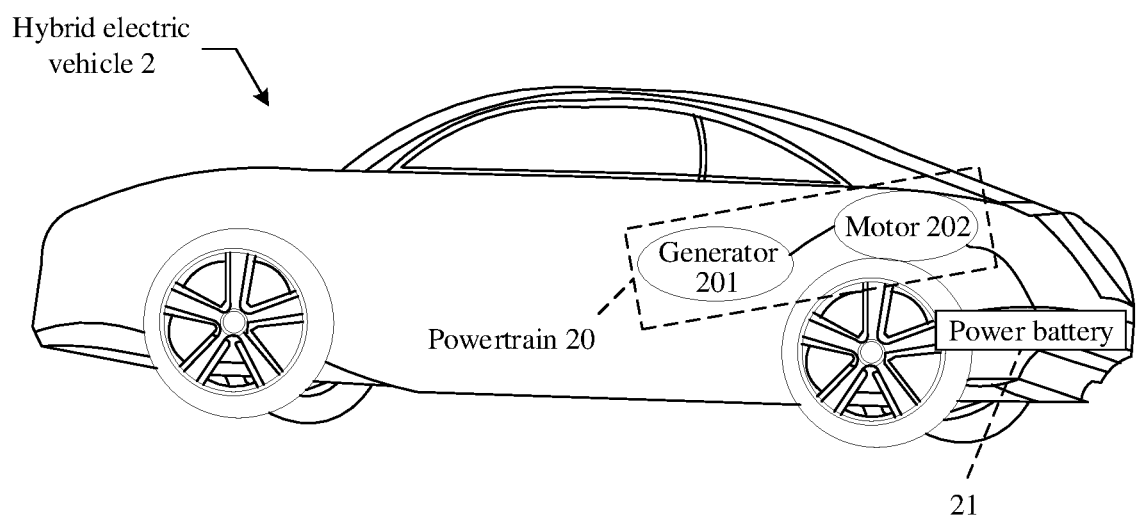
FIG. 2 is a schematic diagram of a structure of a hybrid electric vehicle according to an embodiment.

FIG. 2 is a schematic diagram of a structure of a hybrid electric vehicle according to an embodiment. As shown in FIG. 2, the hybrid electric vehicle 2 includes a powertrain 20 and a power battery 21.

The hybrid electric vehicle 2 is a new-energy vehicle with functions of both an all-electric vehicle and a gasoline-powered vehicle. In this embodiment, the powertrain 20 in the hybrid electric vehicle 2 includes both a generator 201 and a motor 202. For example, the hybrid electric vehicle 2 may be understood as a plug-in hybrid electric vehicle (PHEV).

In an implementation, the generator 201 is in direct mechanical contact with an internal combustion engine and is driven by the internal combustion engine. The generator 201 may convert mechanical energy into electrical energy in a rotation (such as torque outputting) process. The generator 201 may transmit the electrical energy to the motor 202. In other words, the generator 201 provides a driving voltage for the motor 202, to enable the motor 202 to output torque.

If the motor 202 is connected to the power battery 21, the power battery 21 may also provide a driving voltage for the motor 202. In other words, the power battery 21 discharges, to enable the motor 202 to output torque. Alternatively, the generator 201 and the power battery 21 simultaneously transmit electrical energy to the motor 202. In other words, the generator 201 and the power battery 21 simultaneously provide a driving voltage for the motor 202, to enable the motor 202 to output torque.

The motor 202 is in mechanical contact with a transmission system (for example, a transmission shaft). Therefore, the motor 202 may drive the hybrid electric vehicle 2 by using the transmission system in a torque outputting process.

Different from a structure of a prior-art powertrain, there is a connection relationship between the power battery and the motor in this embodiment, and the power battery may be charged or discharge by using the motor. In other words, this embodiment may provide a structure of a new powertrain.

Figure 3:
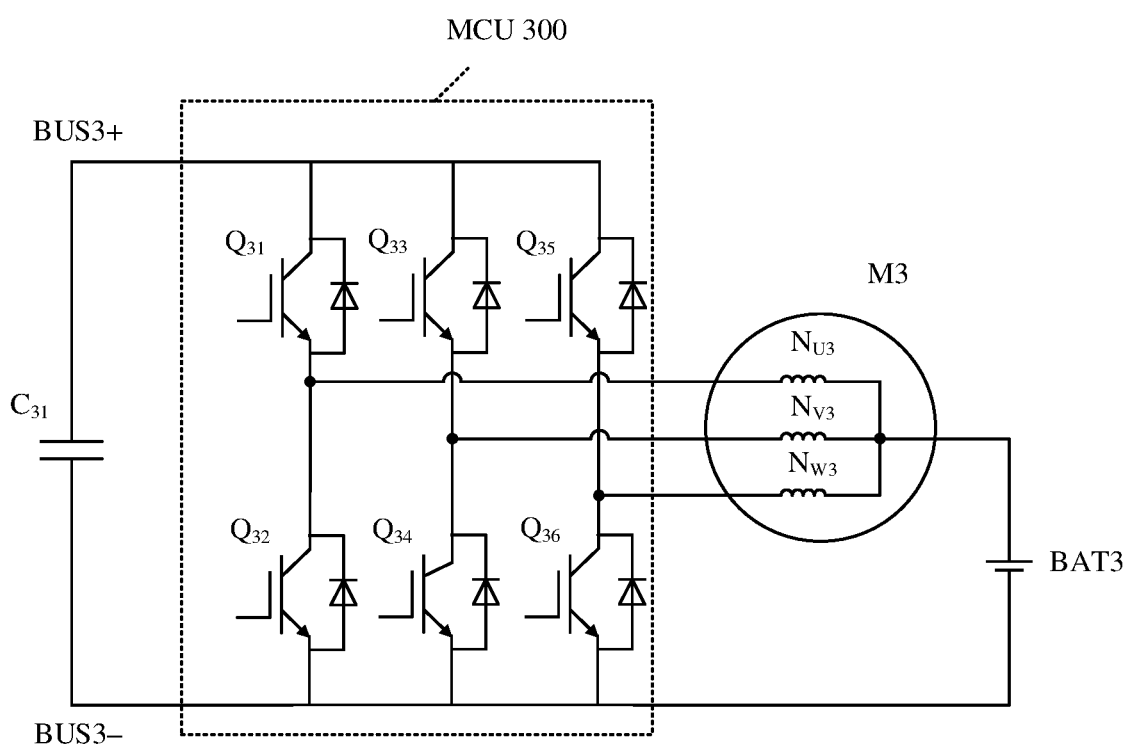
FIG. 3 is a schematic diagram of a structure of a powertrain according to an embodiment.

In some implementations, reference may be made to FIG. 3. FIG. 3 is a schematic diagram of a structure of a powertrain according to an embodiment. As shown in FIG. 3, the powertrain provided in this embodiment may include a motor controller unit (MCU) 300 and a motor M3.

In an implementation, the MCU 300 may include three bridge arms, and the motor M3 may include three motor windings (for example, motor windings $N_{U3}$, $N_{V3}$, and $N_{W3}$) corresponding to the three bridge arms.

It should be noted that each bridge arm may include two switch units connected in series, and the switch unit may include at least one switch connected in series or in parallel. For the switch unit, a plurality of switches connected in series or in parallel may be selected depending on a voltage and a current in the MCU. The switch may be implemented as an insulated gate bipolar transistor (IGBT) and an anti-parallel diode of the IGBT, a metal-oxide semiconductor field-effect transistor (MOSFET), or the like. In conclusion, a switch type and a quantity of switches in the switch unit are not limited in this embodiment.

In this embodiment, an example in which a switch included in a bridge arm may be implemented as an IGBT and an anti-parallel diode of the IGBT may be used. A first end of each of the three bridge arms is connected to a positive bus BUS3+. A collector of a switch transistor $Q_{31}$, a collector of a switch transistor $Q_{33}$, and a collector of a switch transistor $Q_{35}$ may be connected to the positive bus BUS3+. A second end of each bridge arm is connected to a negative bus BUS3−. An emitter of the switch transistor $Q_{32}$, an emitter of the switch transistor $Q_{34}$, and an emitter of the switch transistor $Q_{36}$ may be connected to the negative bus BUS3−. A midpoint of each bridge arm is connected to one end of one motor winding. An emitter of the switch transistor $Q_{31}$ and a collector of the switch transistor $Q_{32}$ may be connected to one end of the motor winding $N_{U3}$, an emitter of the switch transistor $Q_{33}$ and a collector of the switch transistor $Q_{34}$ may be connected to one end of the motor winding $N_{V3}$, and an emitter of the switch transistor $Q_{35}$ and a collector of the switch transistor $Q_{36}$ may be connected to one end of the motor winding $N_{W3}$.

The other end of the motor winding $N_{U3}$, the other end of the motor winding $N_{V3}$, and the other end of the motor winding $N_{W3}$ are connected to one end of a power battery BAT3, and the other end of the power battery BAT3 is connected to the negative bus BUS3−.

Optionally, the powertrain further includes a bus capacitor unit connected between the positive bus BUS3+ and the negative bus BUS3−. It should be noted that, in this embodiment, an example in which the bus capacitor unit includes one capacitor $C_{31}$ may be used. In some implementations, the bus capacitor unit may include at least two capacitors connected in series or in parallel. In other words, a quantity of capacitors in the bus capacitor unit and a manner in which the capacitors are connected are not limited in this embodiment.

Different from the prior art in which a power battery is connected to a dedicated bi-directional DC/DC converter, in this embodiment, the power battery is connected to three motor windings in the motor, and charging and discharging of the power battery are implemented by reusing the motor windings and the bridge arms. In other words, this embodiment may provide a structure of a new powertrain, so that a bi-directional DC/DC converter for charging and discharging a power battery can be saved, and production costs of the powertrain are reduced.

In addition, the bi-directional DC/DC converter in an existing powertrain needs to be equipped with a heat dissipation apparatus. In this embodiment, when the bi-directional DC/DC converter is saved, the heat dissipation apparatus of the bi-directional DC/DC converter can be naturally saved. In addition, the bi-directional DC/DC converter includes a plurality of switch transistors, and the switch transistors in the bi-directional DC/DC converter also need to be controlled by a control chip. In this embodiment, when the bi-directional DC/DC converter is saved, the control chip for controlling the bi-directional DC/DC converter can also be naturally saved. In other words, in addition to the production costs directly caused by the bi-directional DC/DC converter, the total production costs reduced by the powertrain further include costs caused by other configurations (for example, the heat dissipation apparatus and the control chip) required for using the bi-directional DC/DC converter. In addition, in this embodiment, power supply to the control chip and power supply to the bi-directional DC/DC converter can be reduced, so that complexity of power distribution of the powertrain is reduced, and complexity of the structure of the powertrain is also reduced.

Figure 4:
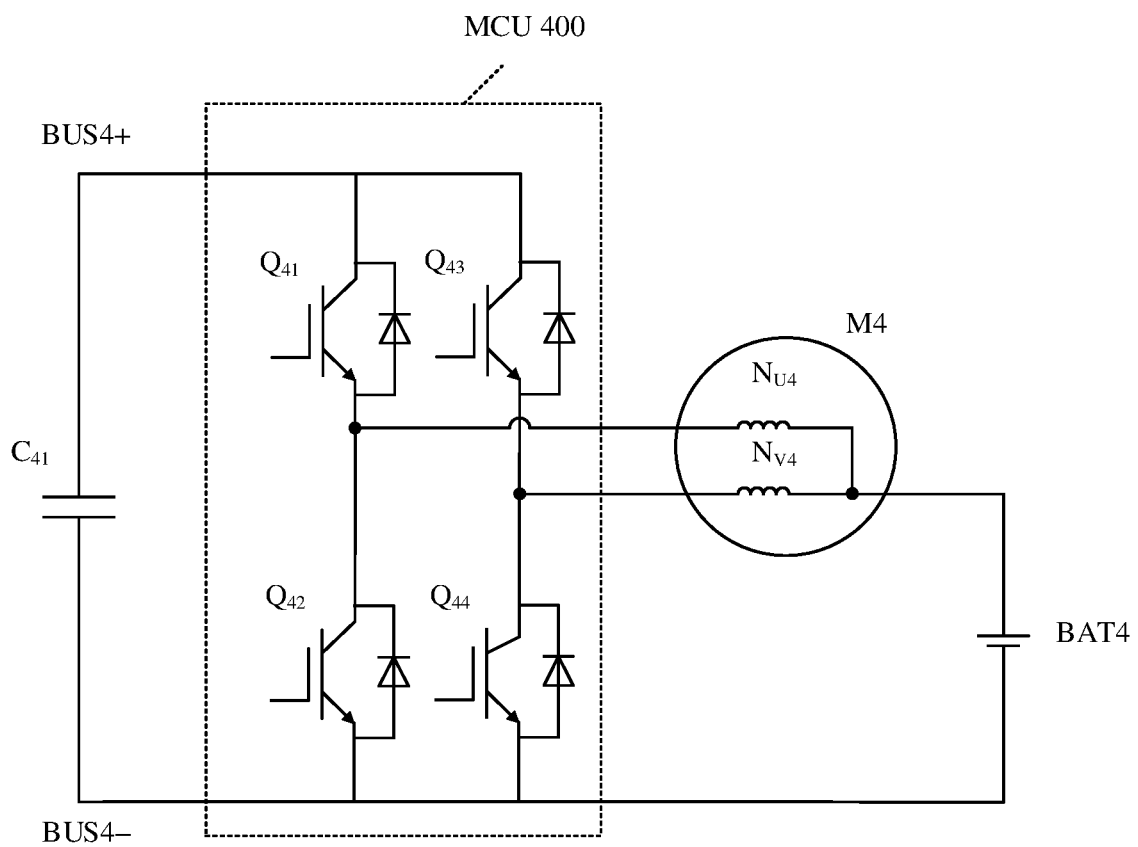
FIG. 4 is another schematic diagram of a structure of a powertrain according to an embodiment.

Optionally, in some implementations, the structure of the powertrain may alternatively be implemented as a structure of a powertrain shown in FIG. 4. As shown in FIG. 4, the powertrain provided in this embodiment includes an MCU 400 and a motor M4.

In an implementation, the MCU 400 may include two bridge arms, and the motor M4 may include two motor windings (for example, motor windings $N_{U4}$ and $N_{V4}$) corresponding to the two bridge arms. In this case, a collector of a switch transistor $Q_{41}$ and a collector of a switch transistor $Q_{43}$ are connected to a positive bus BUS4+; an emitter of a switch transistor $Q_{42}$ and an emitter of a switch transistor $Q_{44}$ are connected to a negative bus BUS4−; an emitter of the switch transistor $Q_{41}$ and a collector of the switch transistor $Q_{42}$ are connected to one end of the motor winding $N_{U4}$; and an emitter of the switch transistor $Q_{43}$ and a collector of the switch transistor $Q_{44}$ are connected to one end of the motor winding $N_{V4}$. The other end of the motor winding $N_{U4}$ and the other end of the motor winding $N_{V4}$ are connected to one end of a power battery BAT4, and the other end of the power battery BAT4 is connected to the negative bus BUS4−.

Optionally, the powertrain further includes a bus capacitor unit (for example, a capacitor $C_{41}$) connected between the positive bus BUS4+ and the negative bus BUS4−.

Different from the powertrain shown in FIG. 3, the motor included in the powertrain provided in this embodiment may be a two-phase alternating current motor, and the powertrain in FIG. 3 may include a three-phase alternating current motor. Therefore, two bridge arms are correspondingly disposed in the MCU provided in this embodiment.

It can be understood that the power battery in this embodiment may also be connected to the motor windings, and charging and discharging of the power battery may also be implemented by reusing the motor windings and the bridge arms, so that a bi-directional DC/DC converter for charging and discharging the power battery is saved, and production costs of the powertrain are reduced.

Figure 5:
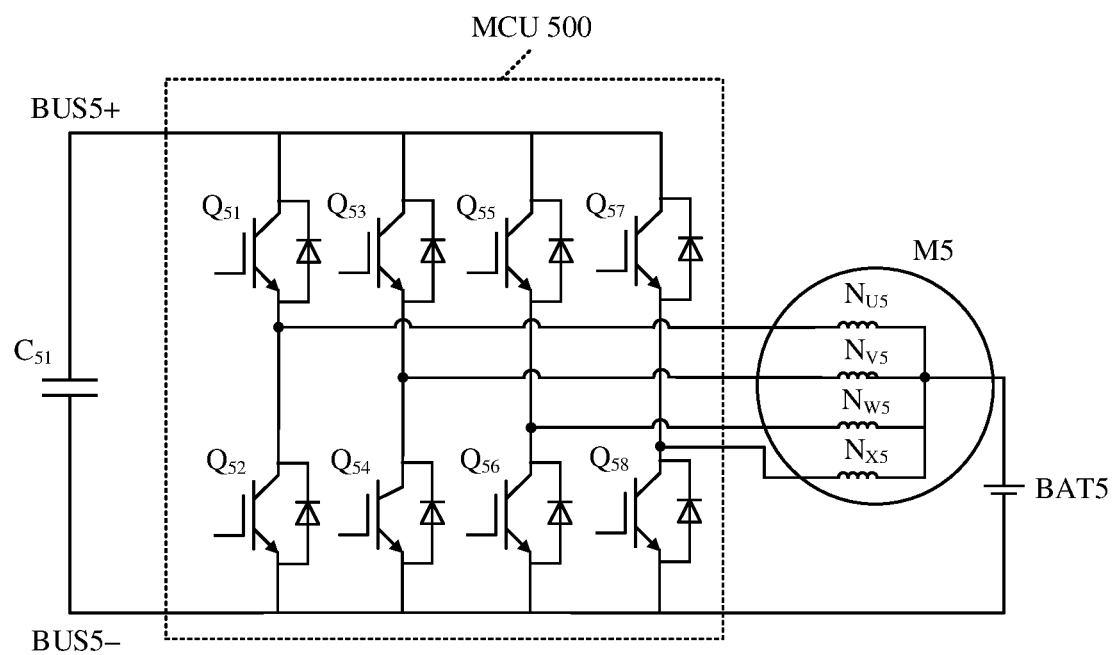
FIG. 5 is another schematic diagram of a structure of a powertrain according to an embodiment.

Optionally, in some implementations, the structure of the powertrain may alternatively be implemented as a structure of a powertrain shown in FIG. 5. As shown in FIG. 5, the powertrain provided in this embodiment includes an MCU 500 and a motor M5.

In an implementation, the MCU 500 may include four bridge arms, and the motor M5 may include four motor windings (for example, motor windings $N_{U5}$, $N_{V5}$, $N_{W5}$, and $N_{X5}$) corresponding to the four bridge arms. In this case, a collector of a switch transistor $Q_{51}$, a collector of a switch transistor $Q_{53}$, a collector of a switch transistor $Q_{55}$, and a collector of a switch transistor $Q_{57}$ are connected to a positive bus BUS5+; and an emitter of a switch transistor $Q_{52}$, an emitter of a switch transistor $Q_{54}$, an emitter of a switch transistor $Q_{56}$, and an emitter of a switch transistor $Q_{58}$ are connected to a negative bus BUS5−. An emitter of the switch transistor $Q_{51}$ and a collector of the switch transistor $Q_{52}$ are connected to one end of the motor winding $N_{U5}$, an emitter of the switch transistor $Q_{53}$ and a collector of the switch transistor $Q_{54}$ are connected to one end of the motor winding $N_{V5}$, an emitter of the switch transistor $Q_{55}$ and a collector of the switch transistor $Q_{56}$ are connected to one end of the motor winding $N_{W5}$, and an emitter of the switch transistor $Q_{57}$ and a collector of the switch transistor $Q_{58}$ are connected to one end of the motor winding $N_{X5}$. The other end of the motor winding $N_{U5}$, the other end of the motor winding $N_{V5}$, the other end of the motor winding $N_{W5}$, and the other end of the motor winding $N_{X5}$ are connected to one end of a power battery BAT5, and the other end of the power battery BAT5 is connected to the negative bus BUS5−.

Optionally, the powertrain further includes a bus capacitor unit (for example, a capacitor $C_{51}$) connected between the positive bus BUS5+ and the negative bus BUS5−.

The motor included in the powertrain provided in this embodiment may be a four-phase alternating current motor and four bridge arms may be correspondingly disposed in the MCU.

It can be understood that the power battery in this embodiment may also be connected to the motor windings, and charging and discharging of the power battery may also be implemented by reusing the motor windings and the bridge arms, so that a bi-directional DC/DC converter for charging and discharging the power battery is saved, and production costs of the powertrain are reduced.

With reference to the structures of the powertrains shown in FIG. 3 to FIG. 5, it can be understood that the motor in the powertrain may be a two-phase alternating current motor, a three-phase alternating current motor, a four-phase alternating current motor, or the like. In other words, an implementation type of the motor is not limited. Therefore, the structure of the powertrain may also be adaptively changed based on different motor types. For example, a quantity of bridge arms is changed. In other words, the powertrain may further include five bridge arms, six bridge arms, or the like.

The bridge arm included in the MCU shown in FIG. 3 to FIG. 5 is a bridge arm that outputs two levels. In some implementations, a type of the bridge arm may also be changed to obtain a bridge arm that outputs a plurality of levels, so as to obtain a structure of a different powertrain.

Figure 6:
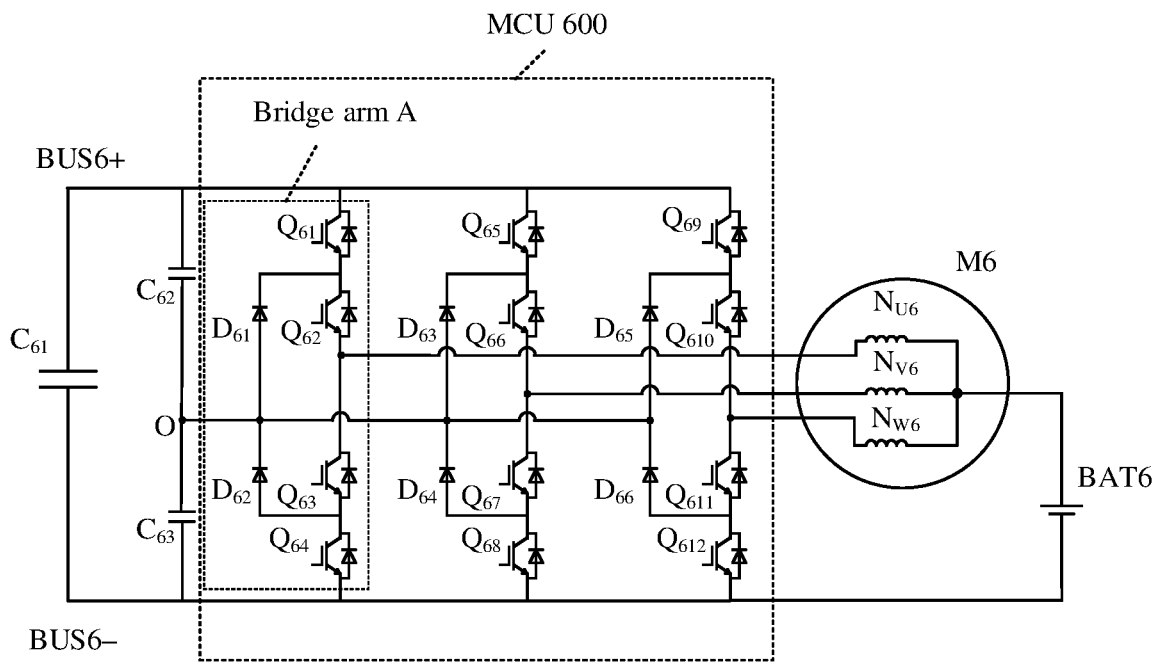
FIG. 6 is another schematic diagram of a structure of a powertrain according to an embodiment.

In some implementations, reference may be made to FIG. 6. FIG. 6 is still another schematic diagram of a structure of a powertrain according to an embodiment. As shown in FIG. 6, the powertrain provided in this embodiment may include an MCU 600 and a motor M6.

In an implementation, an example in which the motor M6 may be implemented as a three-phase alternating current motor is used. The MCU 600 includes three bridge arms A, and the motor M6 includes three motor windings (for example, motor windings $N_{U6}$, $N_{V6}$, and $N_{W6}$) corresponding to the three bridge arms A. A type of the three bridge arms A included in the MCU 600 may be different from that of the bridge arms included in FIG. 3 to FIG. 5.

In this embodiment, the bridge arm A includes a first end, a second end, and a third end. The bridge arm A may output three levels. Each bridge arm A includes two switch units connected in series and two diodes respectively connected to the two switch units. Two ends that are obtained after the two switch units are connected in series are respectively the first end and the second end of the bridge arm A. The first end of the bridge arm A is connected to a positive bus BUS6+, and the second end of the bridge arm A is connected to a negative bus BUS6−. A midpoint of the bridge arm A is a series connection point of the two switch units and is connected to a corresponding motor winding. A connection point of the two diodes in the bridge arm A is the third end of the bridge arm A, and the third end of the bridge arm A is connected to a neutral point O of the positive bus BUS6+ and the negative bus BUS6−. It may be understood that a voltage at the neutral point O is a half of a voltage between the positive bus BUS6+ and the negative bus BUS6−.

In FIG. 6, an example in which one switch unit includes two switches connected in series is used. For example, in one bridge arm A, one switch unit includes a switch transistor $Q_{61}$ and a switch transistor $Q_{62}$, and the other switch unit includes a switch transistor $Q_{63}$ and a switch transistor $Q_{64}$. Therefore, the first end of the bridge arm A is a collector of the switch transistor $Q_{61}$. In this case, the collector of the switch transistor $Q_{61}$ is connected to the positive bus BUS6+. An emitter of the switch transistor $Q_{61}$ is connected to a collector of the switch transistor $Q_{62}$, and a connection point between an emitter of the switch transistor $Q_{62}$ and a collector of the switch transistor $Q_{63}$ is the midpoint of the bridge arm A. In this case, the emitter of the switch transistor $Q_{62}$ and the collector of the switch transistor $Q_{63}$ are connected to one end of the motor winding $N_{U6}$. An emitter of the switch transistor $Q_{63}$ is connected to a collector of the switch transistor $Q_{64}$. The second end of the bridge arm A is an emitter of the switch transistor $Q_{64}$. In this case, the emitter of the switch transistor $Q_{64}$ is connected to the negative bus BUS6−. In addition, a cathode of a diode $D_{61}$ is connected to the emitter of the switch transistor $Q_{61}$ and the collector of the switch transistor $Q_{62}$. A connection point between an anode of the diode $D_{61}$ and a cathode of a diode $D_{62}$ is the third end of the bridge arm A. In this case, the anode of the diode $D_{61}$ and the cathode of the diode $D_{62}$ are connected to the neutral point O of the positive bus BUS6+ and the negative bus BUS6−, and an anode of the diode $D_{62}$ is connected to the emitter of the switch transistor $Q_{63}$ and the collector of the switch transistor $Q_{64}$.

Similarly, in another bridge arm A, a collector of a switch transistor $Q_{65}$ is connected to the positive bus BUS6+, an emitter of the switch transistor $Q_{65}$ is connected to a collector of a switch transistor $Q_{66}$, an emitter of the switch transistor $Q_{66}$ and a collector of a switch transistor $Q_{67}$ are connected to one end of the motor winding $N_{V6}$, an emitter of the switch transistor $Q_{67}$ is connected to a collector of a switch transistor $Q_{68}$, and an emitter of the switch transistor $Q_{68}$ is connected to the negative bus BUS6−. In addition, a cathode of a diode $D_{63}$ is connected to the emitter of the switch transistor $Q_{65}$ and the collector of the switch transistor $Q_{66}$, an anode of the diode $D_{63}$ and a cathode of a diode $D_{64}$ are connected to the neutral point O of the positive bus BUS6+ and the negative bus BUS6−, and an anode of the diode $D_{64}$ is connected to the emitter of the switch transistor $Q_{67}$ and the collector of the switch transistor $Q_{68}$.

In still another bridge arm A, a collector of a switch transistor $Q_{69}$ is connected to the positive bus BUS6+, an emitter of the switch transistor $Q_{69}$ is connected to a collector of a switch transistor $Q_{610}$, an emitter of the switch transistor $Q_{610}$ and a collector of a switch transistor $Q_{611}$ are connected to one end of the motor winding $N_{W6}$, an emitter of the switch transistor $Q_{611}$ is connected to a collector of the switch transistor $Q_{612}$, and an emitter of the switch transistor $Q_{612}$ is connected to the negative bus BUS6−. In addition, a cathode of a diode $D_{65}$ is connected to the emitter of the switch transistor $Q_{69}$ and the collector of the switch transistor $Q_{610}$, an anode of the diode $D_{65}$ and a cathode of a diode $D_{66}$ are connected to the neutral point O of the positive bus BUS6+ and the negative bus BUS6−, and an anode of the diode $D_{66}$ is connected to the emitter of the switch transistor $Q_{611}$ and the collector of the switch transistor $Q_{612}$.

The other end of the motor winding $N_{U6}$, the other end of the motor winding $N_{V6}$, and the other end of the motor winding $N_{W6}$ are connected to one end of a power battery BAT6, and the other end of the power battery BAT6 is connected to the negative bus BUS6−.

Optionally, the powertrain further includes a bus capacitor unit (for example, capacitors $C_{61}$, $C_{62}$, and $C_{63}$) connected between the positive bus BUS6+ and the negative bus BUS6−. In this case, the capacitor $C_{62}$ and the capacitor $C_{63}$ are connected in series between the positive bus BUS6+ and the negative bus BUS6−, and a series connection point between the capacitor $C_{62}$ and the capacitor $C_{63}$ is the neutral point O.

Different from the three bridge arms included in the MCU shown in FIG. 3 that output two levels, the three bridge arms A included in the MCU provided in this embodiment may output three levels. In this case, the powertrain may also implement charging and discharging of the power battery by reusing the motor windings and the bridge arms, so that a bi-directional DC/DC converter for charging and discharging the power battery is saved, and production costs of the powertrain are reduced.

Figure 7:
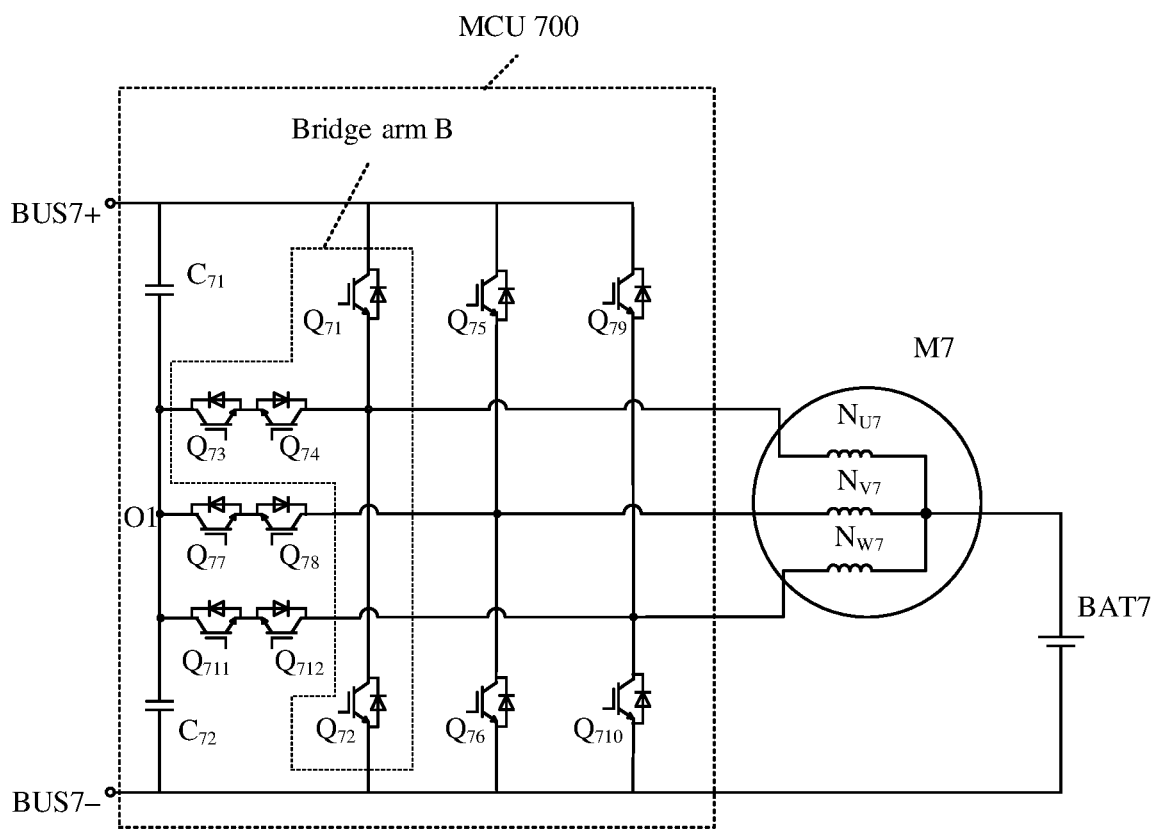
FIG. 7 is another schematic diagram of a structure of a powertrain according to an embodiment.

Optionally, in some implementations, reference may be made to FIG. 7. FIG. 7 is still another schematic diagram of a structure of a powertrain according to an embodiment. As shown in FIG. 7, the powertrain provided in this embodiment may include an MCU 700 and a motor M7.

In an implementation, an example in which the motor M7 may be implemented as a three-phase alternating current motor is used. The MCU 700 includes three bridge arms B, and the motor M7 includes three motor windings (for example, motor windings $N_{U7}$, $N_{V7}$, and $N_{W7}$) corresponding to the three bridge arms B.

In this embodiment, the bridge arm B includes a first end, a second end, and a third end, and the bridge arm B may also output three levels. Each bridge arm B includes a vertical bridge arm and a horizontal bridge arm, and the horizontal bridge arm and the vertical bridge arm each include two switch units connected in series. A midpoint of the vertical bridge arm is a midpoint of the bridge arm B, two ends that are obtained after the two switch units are connected in series in the vertical bridge arm are respectively the first end and the second end of the bridge arm B, one end of the two switch units connected in series in the horizontal bridge arm is connected to the midpoint of the bridge arm B, and the other end is the third end of the bridge arm B.

In FIG. 7, an example in which one switch unit includes one switch is used. For example, in one bridge arm B, the vertical bridge arm includes a switch transistor $Q_{71}$ and a switch transistor $Q_{72}$, and the horizontal bridge arm includes a switch transistor $Q_{73}$ and a switch transistor $Q_{74}$. Therefore, the first end of the bridge arm B is a collector of the switch transistor $Q_{71}$. In this case, the collector of the switch transistor $Q_{71}$ is connected to a positive bus BUS7+. A connection point between an emitter of the switch transistor $Q_{71}$ and a collector of the switch transistor $Q_{72}$ is the midpoint of the bridge arm B. In this case, the emitter of the switch transistor $Q_{71}$ and the collector of the switch transistor $Q_{72}$ are connected to one end of the motor winding $N_{U7}$ and a collector of the switch transistor $Q_{74}$. An emitter of the switch transistor $Q_{74}$ is connected to an emitter of the switch transistor $Q_{73}$. The third end of the bridge arm B is a collector of the switch transistor $Q_{73}$. In this case, the collector of the switch transistor $Q_{73}$ is connected to a neutral point O1 of the positive bus BUS7+ and a negative bus BUS7−.

Similarly, in another bridge arm B, a collector of a switch transistor $Q_{75}$ is connected to the positive bus BUS7+, an emitter of the switch transistor $Q_{75}$ and a collector of a switch transistor $Q_{76}$ are connected to one end of the motor winding $N_{V7}$ and a collector of a switch transistor $Q_{78}$, an emitter of the switch transistor $Q_{78}$ is connected to an emitter of a switch transistor $Q_{77}$, and a collector of the switch transistor $Q_{77}$ is connected to the neutral point O1 of the positive bus BUS7+ and the negative bus BUS7−.

In still another bridge arm B, a collector of a switch transistor $Q_{79}$ is connected to the positive bus BUS7+, an emitter of the switch transistor $Q_{79}$ and a collector of a switch transistor $Q_{710}$ are connected to one end of the motor winding $N_{W7}$ and a collector of a switch transistor $Q_{712}$, an emitter of the switch transistor $Q_{712}$ is connected to an emitter of a switch transistor $Q_{711}$, and a collector of the switch transistor $Q_{711}$ is connected to the neutral point O1 of the positive bus BUS7+ and the negative bus BUS7−.

The other end of the motor winding $N_{U7}$, the other end of the motor winding $N_{V7}$, and the other end of the motor winding $N_{W7}$ are connected to one end of a power battery BAT7, and the other end of the power battery BAT7 is connected to the negative bus BUS7−.

Optionally, the powertrain further includes a bus capacitor unit (for example, capacitors $C_{71}$ and $C_{72}$) connected between the positive bus BUS7+ and the negative bus BUS7−. In this case, the capacitor $C_{71}$ and the capacitor $C_{72}$ are connected in series between the positive bus BUS7+ and the negative bus BUS7−, and a series connection point between the capacitor $C_{71}$ and the capacitor $C_{72}$ is the neutral point O1.

Different from the bridge arm A in FIG. 6 that can output three levels, this embodiment may provide another bridge arm B that can output three levels. In this case, the powertrain may also implement charging and discharging of the power battery by reusing the motor windings and the bridge arms, so that a bi-directional DC/DC converter for charging and discharging the power battery is saved, and production costs of the powertrain are reduced.

It should be noted that, types of the bridge arms included in the MCU in FIG. 6 and FIG. 7 should be understood as examples and should not be construed as limitations. For example, in some implementations, the bridge arm may be implemented as another multi-level bridge arm different from the bridge arms that output two levels and three levels, for example, a multi-level bridge arm such as a four-level bridge arm or a five-level bridge arm, provided that bridge arms and motor windings may implement functions of both a DC/AC converter and a DC/DC converter.

In conclusion, a quantity and a type of the bridge arms in the MCU are not limited in this embodiment.

Optionally, in some implementations, an example in which the MCU includes three bridge arms and each bridge arm outputs two levels is used. In other words, the structure of the powertrain shown in FIG. 3 is used as an example. A powertrain shown in FIG. 8 may be obtained by adding an integrated power generation module to the powertrain shown in FIG. 3. In this case, the powertrain provided in this embodiment may further include a power generation module in addition to the MCU 300 and the motor M3 described with reference to FIG. 3. The power generation module includes a generator control unit (GCU) 801 and a generator M8.

It should be explained that the MCU 300, the motor M3, the GCU 801, and the generator M8 may be all integrated in the powertrain. Alternatively, the MCU 300 and the motor M3 may be integrated in the powertrain, and the GCU 801 and the generator M8 may be separately disposed.

In an implementation, an input end of the GCU 801 is connected to the generator M8, and an output end of the GCU 801 is connected between the positive bus BUS3+ and the negative bus BUS3−. The GCU 801 may convert an alternating current output by the generator M8 into a direct current and output the direct current between the positive bus BUS3+ and the negative bus BUS3−.

Optionally, in some implementations, electrical energy generated by the generator M8 may be provided for the power battery BAT3 and the motor M3; or electrical energy generated by the generator M8 and electrical energy generated by discharging of the power battery BAT3 are jointly provided for the motor M3.

Figure 8:
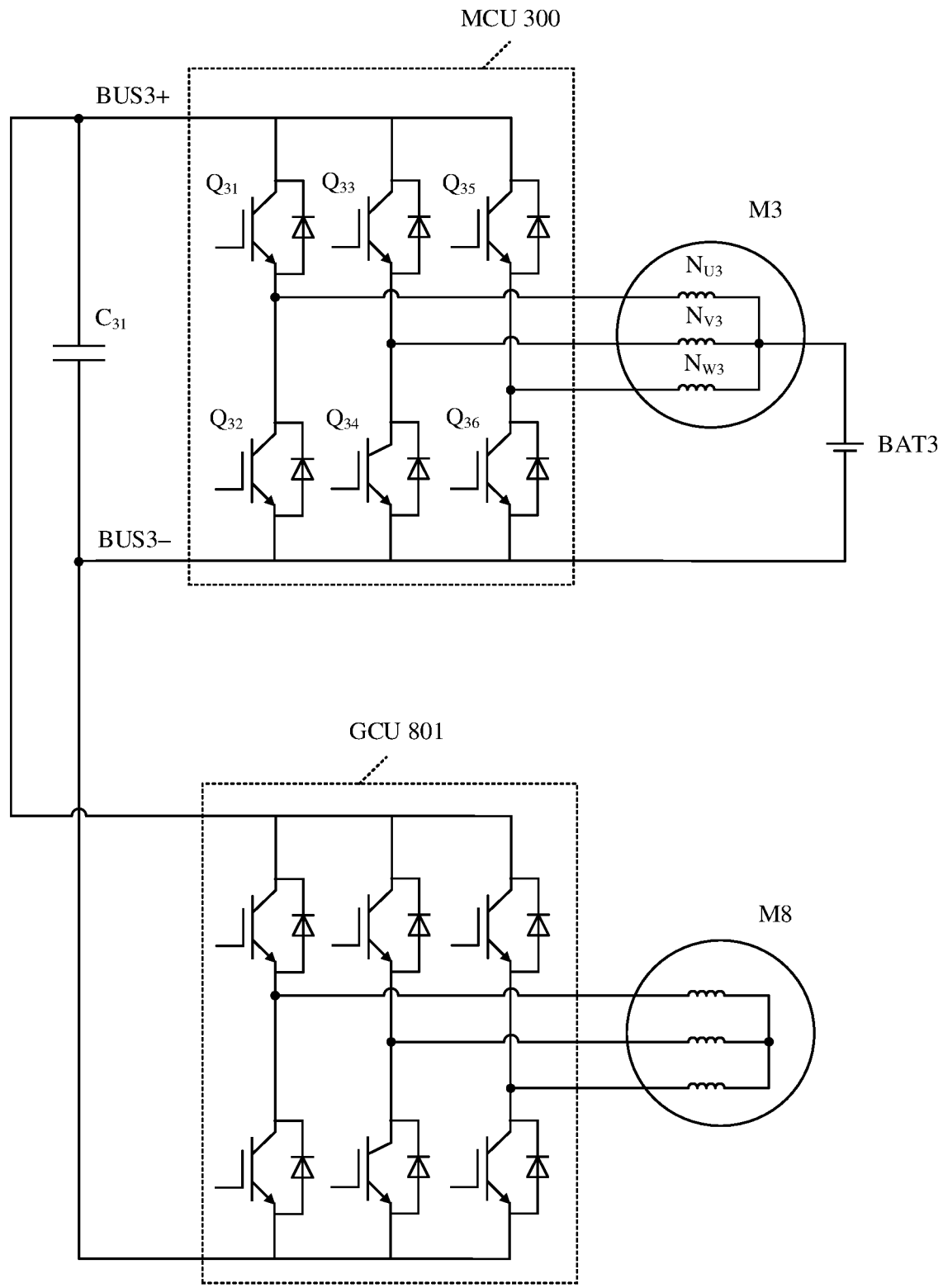
FIG. 8 is another schematic diagram of a structure of a powertrain according to an embodiment.

Compared with the structure of the powertrain shown in FIG. 3, the powertrain shown in FIG. 8 further includes a GCU and a generator, and the embodiment described in FIG. 3 can still be implemented. A bi-directional DC/DC converter for charging and discharging a power battery can be saved, production costs of the powertrain can be reduced, and the powertrain has a simple structure and a simple power distribution structure.

With reference to the accompanying drawings, the following describes, by using examples, how to control the powertrain.

Figure 9:
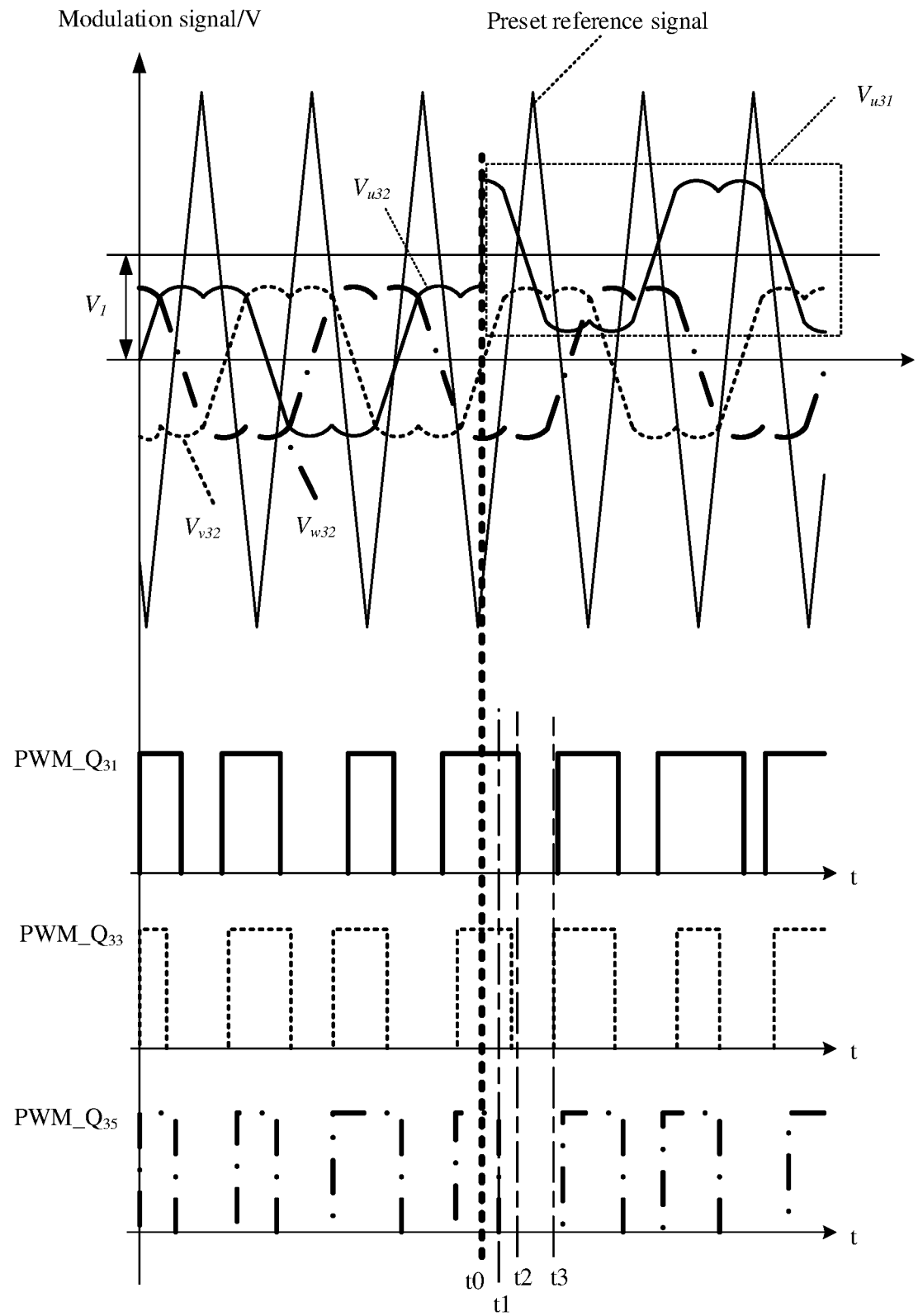
FIG. 9 is a schematic diagram of a waveform according to an embodiment.

In some implementations, reference may be made to FIG. 9. FIG. 9 is a schematic diagram of a waveform according to an embodiment. As shown in FIG. 9, a controller may determine, based on a working parameter of a motor and a bus voltage, a second modulation signal of each bridge arm, for example, a second modulation signal $V_{U32}$, a second modulation signal $V_{V32}$, and a second modulation signal $V_{W32}$. In this case, the bus voltage may be a voltage between the positive bus BUS3+ and the negative bus BUS3−.

The working parameter of the motor may be preset, and the working parameter of the motor includes at least one of an input voltage and an input current of the motor and a motor rotational speed. It should be noted that, the input voltage of the motor may be implemented as the bus voltage, and the bus voltage may be determined by using a working parameter of the generator and an AC/DC converter.

For an implementation in which the controller determines the second modulation signal based on the working parameter of the motor and the bus voltage, refer to an existing control manner of a driving motor. Details are not described herein.

It may be understood that an MCU includes the controller and N bridge arms, where N is greater than or equal to 2. In an implementation, the controller may be, for example, a central processing unit (CPU), another general purpose processor, a digital signal processor (DSP), an application-specific integrated circuit (ASIC), a field programmable gate array (FPGA) or another programmable logic device, a discrete gate or transistor logic device, or a discrete hardware component.

The controller compares the second modulation signal $V_{U32}$ with a preset reference signal. As shown in FIG. 9, the preset reference signal is a triangular wave, and an amplitude and a frequency of the preset reference signal are preset.

In an implementation, when the second modulation signal $V_{U32}$ is greater than the preset reference signal, the controller generates a high level; or when the second modulation signal $V_{U32}$ is less than the preset reference signal, the controller generates a low level. In this case, the controller may generate, based on a result of comparison between the second modulation signal $V_{U32}$ and the preset reference signal, a PWM_$Q_{31}$ signal prior to a moment t0.

Similarly, the controller may generate, based on a result of comparison between the second modulation signal $V_{V32}$ and the preset reference signal, a PWM_$Q_{33}$ signal prior to the moment t0; and the controller may generate, based on a result of comparison between the second modulation signal $V_{W32}$ and the preset reference signal, a PWM_$Q_{35}$ signal prior to the moment t0.

The controller sends the PWM_$Q_{31}$ signal prior to the moment t0 to the switch transistor $Q_{31}$, sends the PWM_$Q_{33}$ signal prior to the moment t0 to the switch transistor $Q_{33}$, and sends the PWM_$Q_{35}$ signal prior to the moment t0 to the switch transistor $Q_{35}$. In this case, a sum of currents of the three motor windings of the motor M3 is zero, and the motor M3 outputs torque.

For example, the switch transistor $Q_{31}$, the switch transistor $Q_{33}$, and the switch transistor $Q_{35}$ are turned off, and the switch transistor $Q_{32}$, the switch transistor $Q_{34}$, and the switch transistor $Q_{36}$ are turned on. A circuit status shown in FIG. 10 may be formed for the powertrain shown in FIG. 3. A current may flow in from the motor winding $N_{U3}$ and may flow out from the motor winding $N_{V3}$ and the motor winding $N_{W3}$. In the circuit status, $I_{U3}+I_{V3}+I_{W3}=0$. In this case, the motor M3 outputs torque to drive a hybrid electric vehicle.

Figure 10:
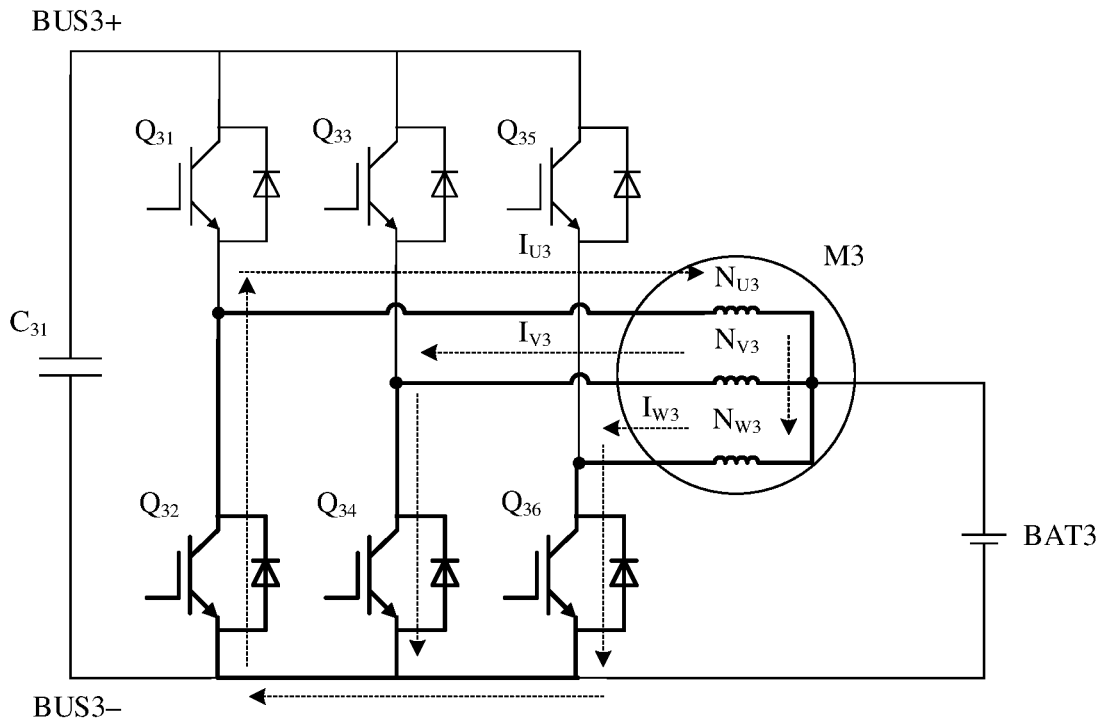
FIG. 10 is a schematic diagram of a circuit status according to an embodiment.

It should be explained that the current loop shown in FIG. 10 should be understood as an example, and the current flowing into the motor winding $N_{U3}$ may be provided by at least one of the generator and the power battery BAT3. In some other implementations, a current may flow in from the motor winding $N_{U3}$ and the motor winding $N_{V3}$, and flow out from the motor winding $N_{W3}$. No matter how current directions of the motor windings change, when the sum of the currents of the three motor windings is zero, for example, $I_{U3}+I_{V3}+I_{W3}=0$, the motor M3 outputs torque.

Signals of the controller for controlling two switch transistors in a same bridge arm are complementary. A signal sent by the controller to the switch transistor $Q_{32}$ may be complementary to the PWM_$Q_{31}$ signal, a signal sent by the controller to the switch transistor $Q_{34}$ may be complementary to the PWM_$Q_{33}$ signal, and a signal sent by the controller to the switch transistor $Q_{36}$ may be complementary to the PWM_$Q_{35}$ signal.

Optionally, in some implementations, the controller may determine at least one first bridge arm from the three bridge arms and may add a preset target value $V_1$ to a second modulation signal of each first bridge arm, to obtain a first modulation signal of each first bridge arm. The preset target value $V_1$ is determined by the controller based on a voltage of the power battery BAT3 and the bus voltage. For example, the preset target value $V_1$ is a ratio of the voltage of the power battery BAT3 to the bus voltage.

In FIG. 9, an example in which the controller determines one first bridge arm from the three bridge arms is used, and a bridge arm formed by connecting the switch transistor $Q_{31}$ and the switch transistor $Q_{32}$ in series is the first bridge arm. It can be understood from FIG. 9 that, compared with an amplitude of the second modulation signal $V_{U32}$ prior to the moment t0, an amplitude of a first modulation signal $V_{U31}$ subsequent to the moment t0 is increased by the preset target value $V_1$. In other words, the preset target value $V_1$ is used as a positive bias voltage, and the controller adds the preset target value $V_1$ to the second modulation signal $V_{U32}$, to obtain the first modulation signal $V_{U31}$.

In this case, the controller compares the first modulation signal $V_{U31}$ with the preset reference signal, to generate a PWM_$Q_{31}$ signal (that is, a first PWM signal of a first bridge arm on which the switch transistor $Q_{31}$ is located) subsequent to the moment t0. It can be understood that a duty cycle of the PWM_$Q_{31}$ signal subsequent to the moment t0 is greater than a duty cycle of the PWM_$Q_{31}$ signal subsequent to the moment t0. The controller may add the preset target value $V_1$ to the second modulation signal $V_{U32}$, and a duty cycle of a control signal of the switch transistor $Q_{31}$ may be increased.

For bridge arms other than the first bridge arm, modulation signals prior to the moment t0 are still used. The second modulation signal $V_{V32}$ and the second modulation signal $V_{W32}$ may still be used. Therefore, duty cycles of the PWM_$Q_{33}$ signal and the PWM_$Q_{35}$ signal prior to and subsequent to the moment t0 do not change.

The controller sends the PWM_$Q_{31}$ signal subsequent to the moment t0 to the switch transistor $Q_{31}$, sends the PWM_$Q_{33}$ signal subsequent to the moment t0 to the switch transistor $Q_{33}$, and sends the PWM_$Q_{35}$ signal subsequent to the moment t0 to the switch transistor $Q_{35}$. In this case, the capacitor $C_{31}$ charges the power battery BAT3 through the motor winding $N_{U3}$, charges the power battery BAT3 through the motor winding $N_{V3}$, and charges the power battery BAT3 through the motor winding $N_{W3}$. In addition, the motor M3 outputs torque. In this case, energy stored in the capacitor $C_{31}$ may be provided by a generator. A GCU connected to the generator converts a voltage output by the generator to obtain a first voltage, may convert an alternating current output by the generator into a direct current and then the MCU may convert the first voltage to drive the motor M3 to output torque. In conclusion, the first bridge arm and the motor winding connected to the first bridge arm may ensure a function of an electric drive system of the motor, and may implement a function of a DC/AC converter. In addition, the first bridge arm and the motor winding connected to the first bridge arm may implement a function of a DC/DC converter, and implement a voltage step-down function of the DC/DC converter, such as implementing a function of a buck converter. In other words, the generator drives the motor, and the generator charges the power battery.

Figure 11A:
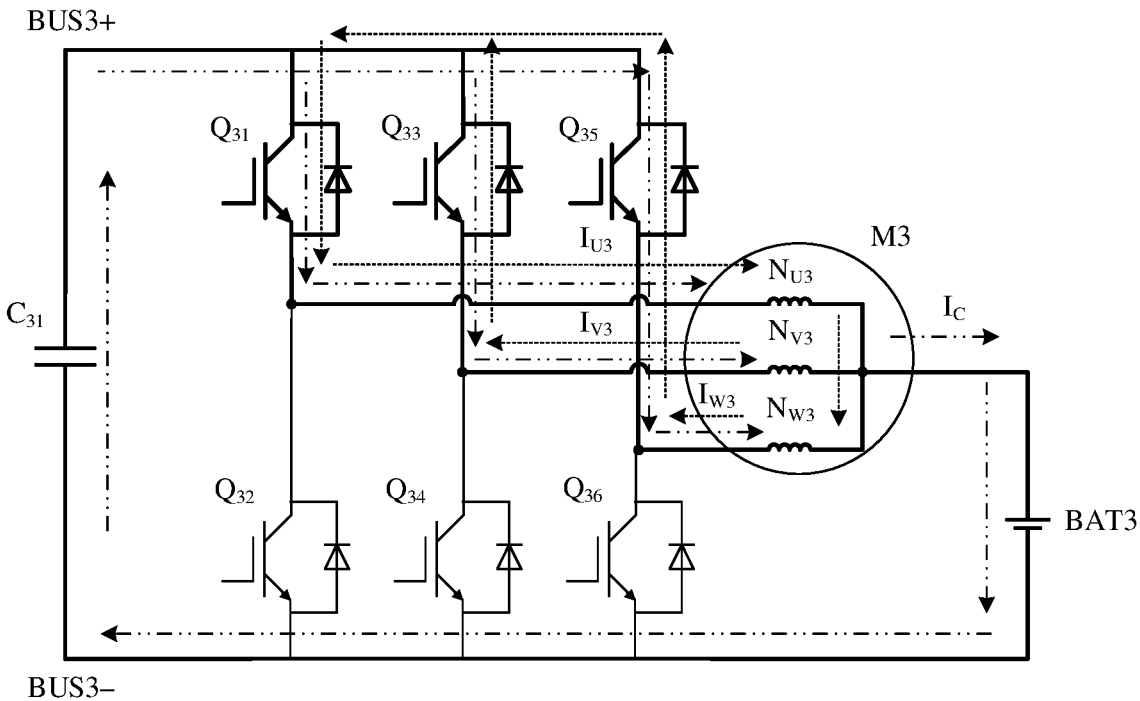
FIG. 11A and FIG. 11B each are a schematic diagram of still another circuit status according to an embodiment.

For example, in a time period from the moment t0 to a moment t1, the PWM_$Q_{31}$ signal, the PWM_$Q_{33}$ signal, and the PWM_$Q_{35}$ are all at a high level. The switch transistor $Q_{31}$, the switch transistor $Q_{33}$, and the switch transistor $Q_{35}$ may be turned on, and the switch transistor $Q_{32}$, the switch transistor $Q_{34}$, and the switch transistor $Q_{36}$ may be turned off. A circuit status shown in FIG. 11A may be formed for the powertrain. As shown in FIG. 11A, it is assumed that inductive reactances of the three motor windings are the same. Therefore, a current flowing through the motor winding $N_{U3}$ is $I_{U3}+I_C/3$, a current flowing through the motor winding $N_{V3}$ is $I_{V3}+I_C/3$, and a current flowing through the motor winding $N_{W3}$ is $I_{W3}+I_C/3$, where $I_{U3}+I_{V3}+I_{W3}=0$. In this case, the motor M3 outputs torque, and the three motor windings are in an energy storage stage.

It should be explained that a current direction in a process in which the motor M3 outputs torque is random, and a current may flow in from the motor winding $N_{U3}$ and the motor winding $N_{V3}$, and flow out from the motor winding $N_{W3}$. No matter how current directions of the motor windings change, the sum of the currents of the three motor windings is zero, for example, $I_{U3}+I_{V3}+I_{W3}=0$.

Figure 11B:
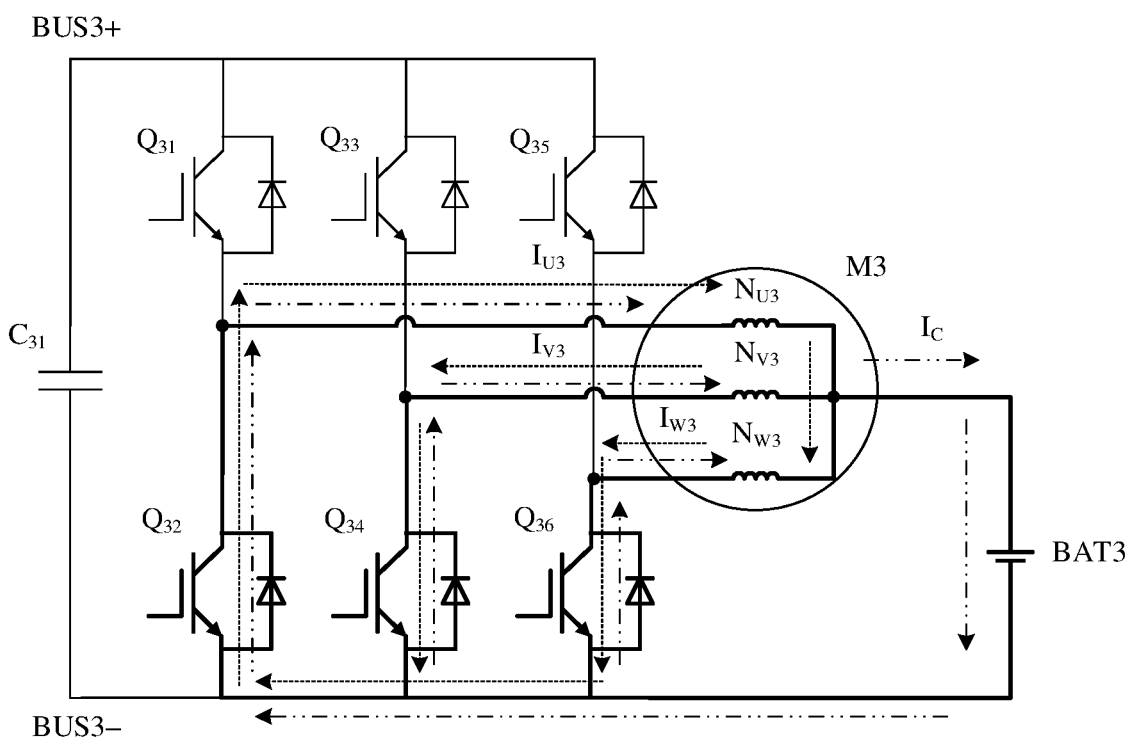

In a time period from a moment t2 to a moment t3, the PWM_$Q_{31}$ signal, the PWM_$Q_{33}$ signal, and the PWM_$Q_{35}$ signal are all at a low level. The switch transistor $Q_{31}$, the switch transistor $Q_{33}$, and the switch transistor $Q_{35}$ may be turned off, and the switch transistor $Q_{32}$, the switch transistor $Q_{34}$, and the switch transistor $Q_{36}$ may be turned on. A circuit status shown in FIG. 11B may be formed for the powertrain. As shown in FIG. 11B, the currents of the motor windings cannot change abruptly, and the currents flowing through the three motor windings are still the currents that flow in the circuit status shown in FIG. 11A. The current flowing through the motor winding $N_{U3}$ may be $I_{U3}+I_C/3$, the current flowing through the motor winding $N_{V3}$ is $I_{V3}+I_C/3$, and the current flowing through the motor winding $N_{W3}$ may be $I_{W3}+I_C/3$, where $I_{U3}+I_{V3}+I_{W3}=0$. In this case, the motor M3 outputs torque. In addition, the motor winding $N_{U3}$ charges the power battery BAT3, the motor winding $N_{V3}$ charges the power battery BAT3, and the motor winding $N_{W3}$ charges the power battery BAT3. A current on each motor winding is provided by the capacitor $C_{31}$. The capacitor $C_{31}$ may charge the power battery BAT3 through the motor winding connected to the first bridge arm, where a charging current is $I_C$.

The controller may directly send the PWM_$Q_{31}$ signal, the PWM_$Q_{33}$ signal, and the PWM_$Q_{35}$ signal that are subsequent to the moment t0. Alternatively, the PWM_$Q_{31}$ signal, the PWM_$Q_{33}$ signal, and the PWM_$Q_{35}$ signal that are prior to the moment t0 are directly sent. In other words, signals prior to the moment t0 and signals subsequent to the moment t0 may exist relatively independently.

Optionally, in some implementations, the controller may determine, depending on a battery level of a power battery, a control signal to be sent to each bridge arm. For example, if the controller detects that a battery level of the power battery BAT3 is lower than a preset charging threshold, the controller sends the PWM_$Q_{31}$ signal subsequent to the moment t0 to the switch transistor $Q_{31}$, sends the PWM_$Q_{33}$ signal subsequent to the moment t0 to the switch transistor $Q_{33}$, and sends the PWM_$Q_{35}$ signal subsequent to the moment t0 to the switch transistor $Q_{35}$. When the battery level of the power battery BAT3 is greater than or equal to the preset charging threshold, the controller sends the PWM_$Q_{31}$ signal prior to the moment t0 to the switch transistor $Q_{31}$, sends the PWM_$Q_{33}$ signal prior to the moment t0 to the switch transistor $Q_{33}$, and sends the PWM_$Q_{35}$ signal prior to the moment t0 to the switch transistor $Q_{35}$. Alternatively, when receiving a charging instruction of the power battery BAT3, the controller may send the PWM_$Q_{31}$ signal subsequent to the moment t0 to the switch transistor $Q_{31}$, send the PWM_$Q_{33}$ signal subsequent to the moment t0 to the switch transistor $Q_{33}$, and send the PWM_$Q_{35}$ signal subsequent to the moment t0 to the switch transistor $Q_{35}$.

In conclusion, the preset target value $V_1$ is added to the second modulation signal of one first bridge arm. In other words, one of the three bridge arms is reused for charging control of the power battery. In this embodiment, a time for turning on and turning off the switch transistors corresponding to the first bridge arm is changed, to implement output torque of the motor and charging of the power battery. In other words, the powertrain may implement both a function of the DC/AC converter and a function of the buck converter.

Figure 12:
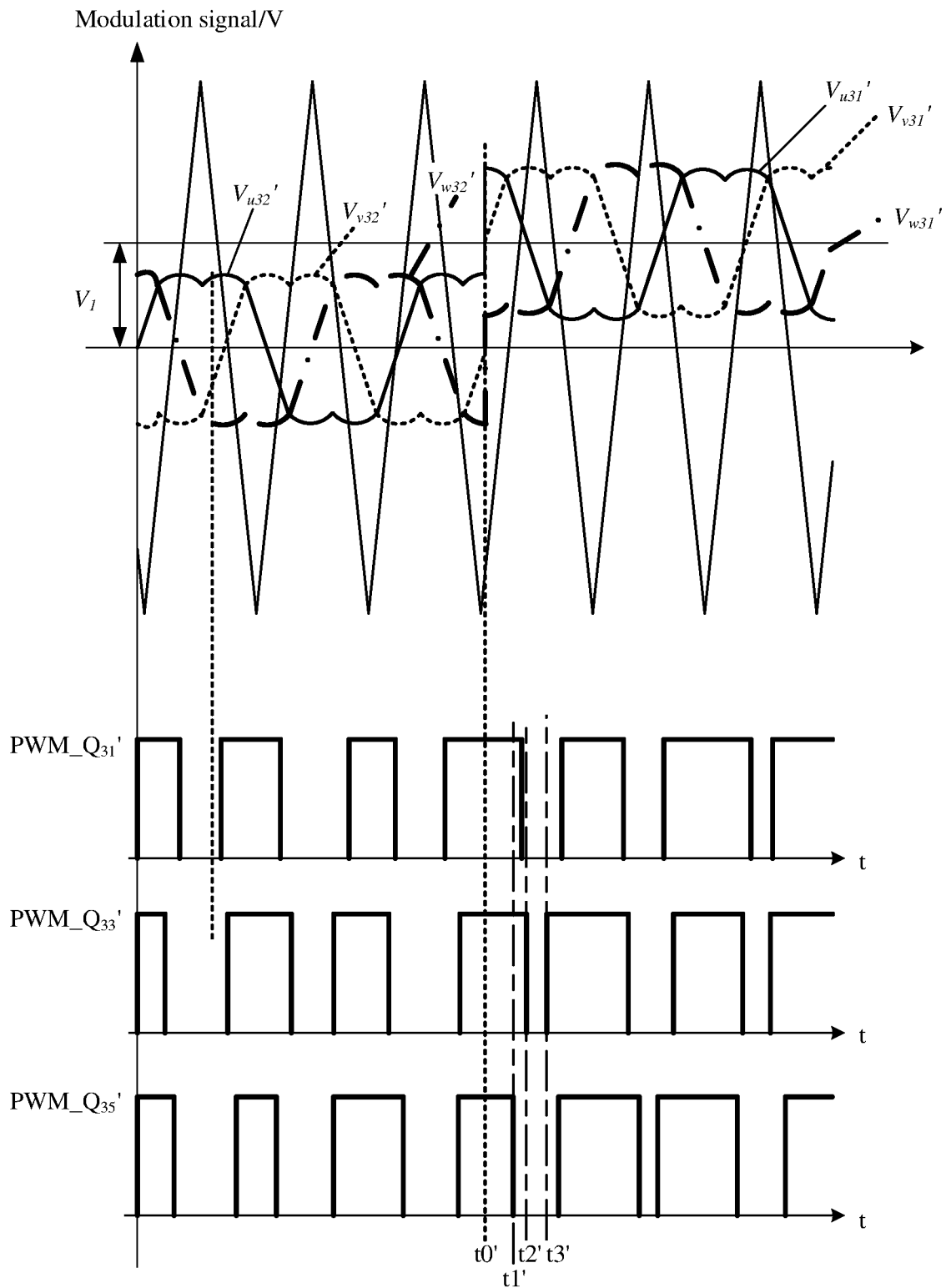
FIG. 12 is a schematic diagram of still another waveform according to an embodiment.

Optionally, in some implementations, reference may be made to FIG. 12. FIG. 12 is a schematic diagram of still another waveform according to an embodiment. As shown in FIG. 12, a controller may determine a second modulation signal, for example, a second modulation signal $V_{U32}'$, a second modulation signal $V_{V32}'$, and a second modulation signal $V_{W32}'$, of each bridge arm based on a working parameter of a motor and a bus voltage.

The controller generates, based on a result of comparison of the second modulation signal $V_{U32}'$ and a preset reference signal, a PWM_$Q_{31}'$ signal prior to a moment t0'. The controller generates, based on a result of comparison of the second modulation signal $V_{V32}'$ and the preset reference signal, a PWM_$Q_{33}'$ signal prior to the moment t0'. The controller generates, based on a result of comparison of the second modulation signal $V_{W32}'$ and the preset reference signal, a PWM_$Q_{35}'$ signal prior to the moment t0'.

The controller sends the PWM_$Q_{31}'$ signal prior to the moment t0' to the switch transistors $Q_{31}$, sends the PWM_$Q_{33}'$ signal prior to the moment t0' to the switch transistors $Q_{33}$, and sends the PWM_$Q_{35}'$ signal prior to the moment t0' to the switch transistors $Q_{35}$. In this case, the circuit status shown in FIG. 10 may also be formed for the powertrain. In the circuit status, $I_{U3}+I_{V3}+I_{W3}=0$, and the motor M3 outputs torque.

Optionally, in some implementations, the controller may use the three bridge arms as three first bridge arms respectively; therefore, the controller adds a preset target value $V_1$ to a second modulation signal of each first bridge arm, so as to obtain a first modulation signal of each first bridge arm.

In this case, the controller adds the preset target value $V_1$ to the second modulation signal $V_{U32}'$ to obtain a first modulation signal $V_{U31}'$, adds the preset target value $V_1$ to the second modulation signal $V_{V32}'$ to obtain a first modulation signal $V_{V31}'$, and adds the preset target value $V_1$ to the second modulation signal $V_{W32}'$ to obtain a first modulation signal $V_{W31}'$.

The controller compares the first modulation signal $V_{U31}'$ with the preset reference signal, to generate a PWM_$Q_{31}'$ signal (that is, a first PWM signal of a first bridge arm on which the switch transistor $Q_{31}$ is located) subsequent to the moment t0'. A duty cycle of the PWM_$Q_{31}'$ signal subsequent to the moment t0' may be greater than a duty cycle of the PWM_$Q_{31}'$ signal prior to the moment t0'.

Similarly, the controller compares the first modulation signal $V_{V31}'$ with the preset reference signal, to generate a PWM_$Q_{33}'$ signal (that is, a first PWM signal of a first bridge arm on which the switch transistor $Q_{33}$ is located) subsequent to the moment t0', where a duty cycle of the PWM_$Q_{33}'$ signal subsequent to the moment t0' is greater than a duty cycle of the PWM_$Q_{33}'$ signal prior to the moment t0'.

The controller compares the first modulation signal $V_{W31}'$ with the preset reference signal, to generate a PWM_$Q_{35}'$ signal (that is, a first PWM signal of a first bridge arm on which the switch transistor $Q_{35}$ is located) subsequent to the moment t0', where a duty cycle of the PWM_$Q_{35}'$ signal subsequent to the moment t0' is greater than a duty cycle of the PWM_$Q_{35}'$ signal prior to the moment t0'.

The controller sends the PWM_$Q_{31}'$ signal subsequent to the moment t0' to the switch transistors $Q_{31}$, sends the PWM_$Q_{33}'$ signal subsequent to the moment t0' to the switch transistors $Q_{33}$, and sends the PWM_$Q_{35}'$ signal subsequent to the moment t0' to the switch transistors $Q_{35}$. In this case, the motor M3 outputs torque, and the power battery BAT3 is charged.

For example, in a time period from the moment t0' to a moment t1', the circuit status shown in FIG. 11A may still be formed for the powertrain; and in a time period from a moment t2' to a moment t3', the circuit status shown in FIG. 11B may still be formed for the powertrain. Therefore, for a circuit status of the powertrain, reference may be made to the descriptions in FIG. 11A and FIG. 11B. Details are not described herein again.

Compared with the schematic diagram of the waveform shown in FIG. 9, the schematic diagram of the waveform shown in FIG. 12 is used by the controller to reuse three bridge arms for charging control of the power battery. The preset target value $V_1$ may be added to the second modulation signal of each of the three bridge arms, and the effect of embodiments described above with reference to FIG. 9 to FIG. 11B can still be implemented. In addition, in this embodiment, the three bridge arms are reused, so that current equalization can be performed among the three bridge arms.

Optionally, in some implementations, the preset target value $V_1$ may be added to second modulation signals of two of the three bridge arms (this is not shown in the figure). In other words, the two bridge arms may be reused for charging control of the power battery. In this case, the circuit statuses in FIG. 11A and FIG. 11B may still be formed, the motor M3 outputs torque, and the power battery BAT3 is in a charging state.

Optionally, in some implementations, the motor may not output torque, and the power battery is in a charging state. In this case, the controller may determine at least one second bridge arm from the three bridge arms of the MCU and determine a second PWM signal of each second bridge arm based on the bus voltage and a voltage of the power battery BAT3.

It may be understood that, for an implementation in which the controller determines the second PWM signal based on the bus voltage and the voltage of the power battery BAT3, reference may be made to an existing manner of determining a control signal of a switch transistor in a buck converter. Details are not described herein again.

Figure 13A:
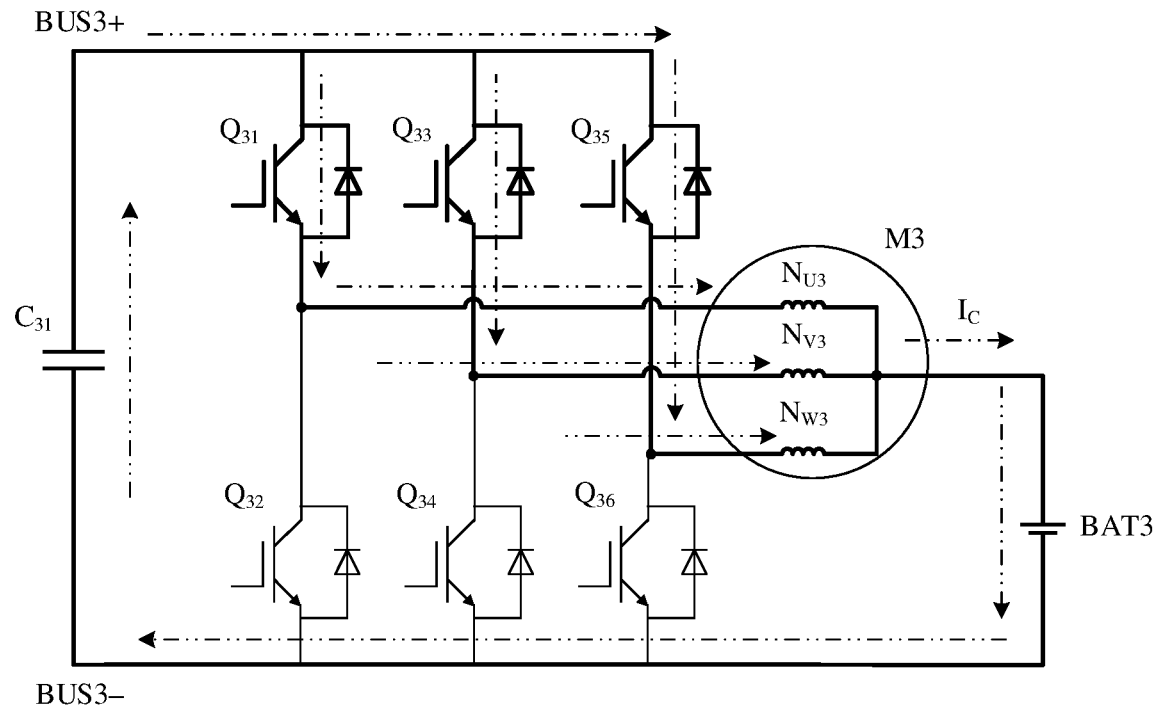
FIG. 13A and FIG. 13B each are a schematic diagram of still another circuit status according to an embodiment.
Figure 13B:
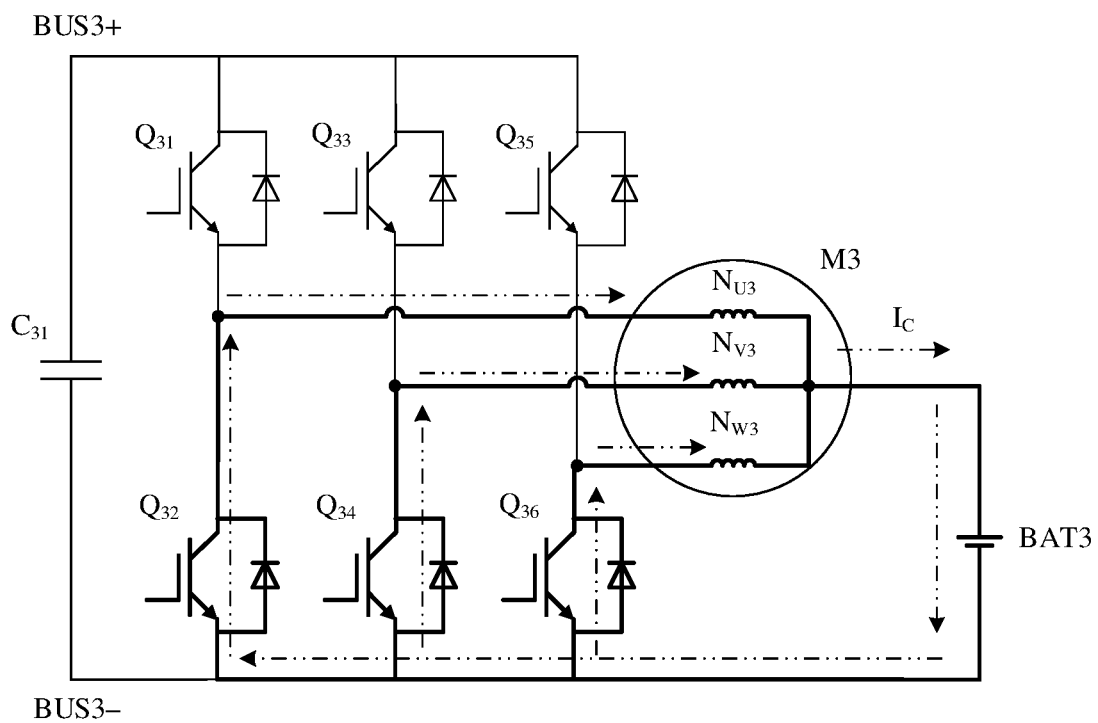

That the capacitor $C_{31}$ charges the power battery BAT3 may be divided into an energy storage phase of motor windings and a power battery charging phase. In FIG. 13A and FIG. 13B, an example in which the three bridge arms are respectively used as three second bridge arms may be used. In a circuit status shown in FIG. 13A, the switch transistor $Q_{31}$, the switch transistor $Q_{33}$, and the switch transistor $Q_{35}$ are turned on, and the switch transistor $Q_{32}$, the switch transistor $Q_{34}$, and the switch transistor $Q_{36}$ are turned off. In this case, the motor winding $N_{U3}$, the motor winding $N_{V3}$, and the motor winding $N_{W3}$ are in an energy storage stage. For example, the circuit status shown in FIG. 11A may be understood as a combination of the circuit status shown in FIG. 13A and the circuit status shown in FIG. 10.

In a circuit status shown in FIG. 13B, the switch transistor $Q_{31}$, the switch transistor $Q_{33}$, and the switch transistor $Q_{35}$ are turned off, and the switch transistor $Q_{32}$, the switch transistor $Q_{34}$, and the switch transistor $Q_{36}$ are turned on. It is assumed that inductive reactances of the three motor windings are the same. Therefore, a current flowing through the motor winding $N_{U3}$ is $I_C/3$, a current flowing through the motor winding $N_{V3}$ is $I_C/3$, and a current flowing through the motor winding $N_{W3}$ is $I_C/3$. In this case, the capacitor $C_{31}$ charges the power battery BAT3 through the motor winding $N_{U3}$, the capacitor $C_{31}$ charges the power battery BAT3 through the motor winding $N_{V3}$, and the capacitor $C_{31}$ charges the power battery BAT3 through the motor winding $N_{W3}$. Therefore, a charging current of the power battery BAT3 may be $I_C$. In addition, energy stored in the capacitor $C_{31}$ may be provided by a generator. A GCU connected to the generator converts a voltage output by the generator to obtain a third voltage, and then the MCU converts the third voltage to charge the power battery BAT3. In conclusion, the generator charges the power battery.

For example, the circuit status shown in FIG. 11B may be understood as a combination of the circuit status shown in FIG. 13B and the circuit status shown in FIG. 10. A current flowing through each motor winding may be a sum of a current flowing through the motor winding when the motor outputs torque and a charging current of the power battery.

It should be noted that, the circuit statuses shown in FIG. 13A and FIG. 13B should be understood as an example. In another implementation, a function of a buck converter can be implemented by controlling only one or two of the three bridge arms.

Figure 14:
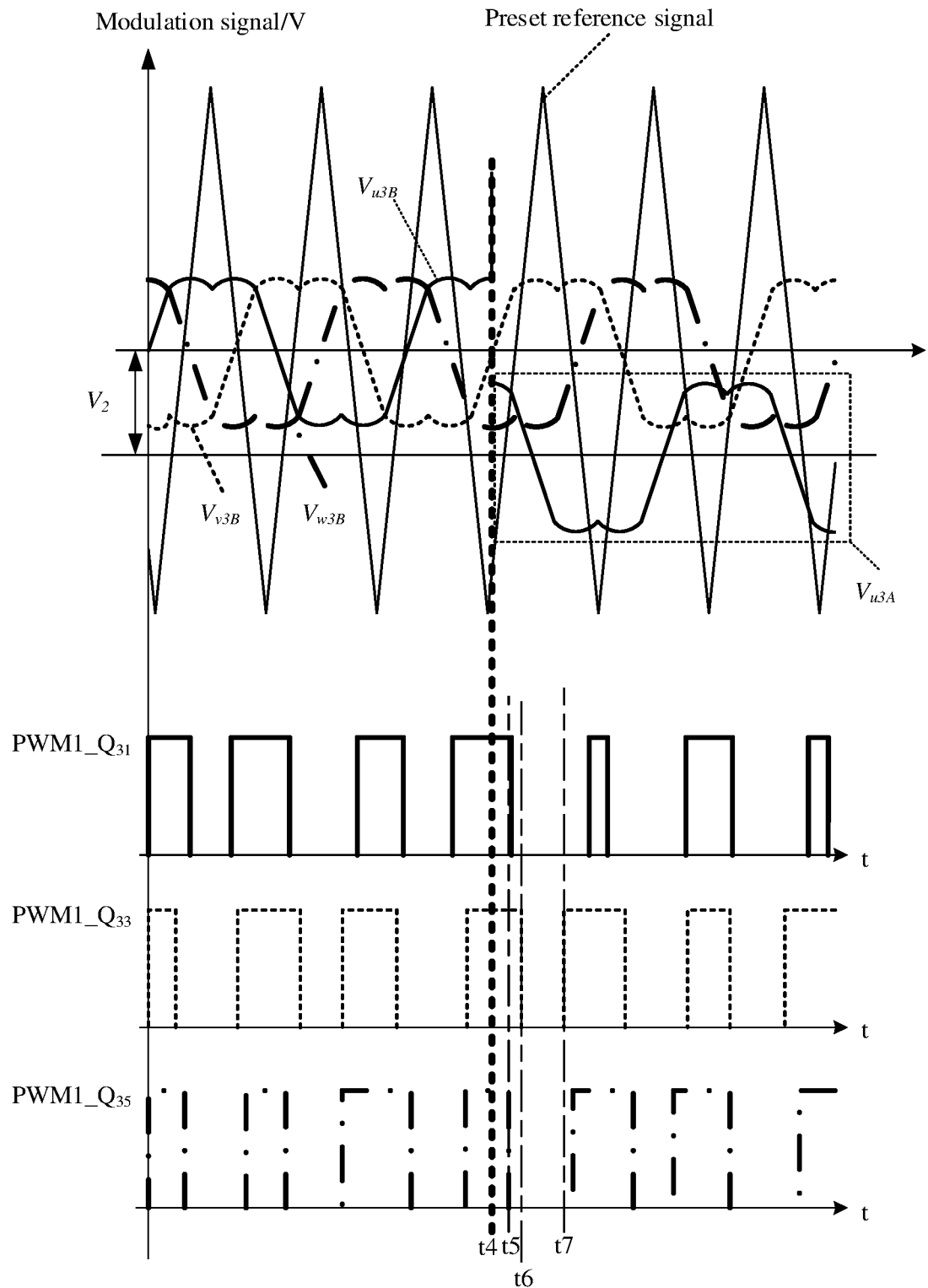
FIG. 14 is a schematic diagram of still another waveform according to an embodiment.

Optionally, in some implementations, reference may be made to FIG. 14. FIG. 14 is a schematic diagram of still another waveform according to an embodiment. As shown in FIG. 14, a controller may determine a second modulation signal, for example, a second modulation signal $V_{U3B}$, a second modulation signal $V_{V3B}$, and a second modulation signal $V_{W3B}$, of each bridge arm based on a working parameter of a motor, a bus voltage, and a voltage of a power battery.

The controller generates, based on a result of comparison of the second modulation signal $V_{U3B}$ and a preset reference signal, a PWM1_$Q_{31}$ signal prior to a moment t4. The controller may generate, based on a result of comparison of the second modulation signal $V_{V3B}$ and the preset reference signal, a PWM1_$Q_{33}$ signal prior to the moment t4. The controller may generate, based on a result of comparison of the second modulation signal $V_{W3B}$ and the preset reference signal, a PWM1_$Q_{35}$ signal prior to the moment t4.

The controller sends the PWM1_$Q_{31}$ signal prior to the moment t4 to the switch transistor $Q_{31}$, sends the PWM1_$Q_{33}$ signal prior to the moment t4 to the switch transistor $Q_{33}$, and sends the PWM1_$Q_{35}$ signal prior to the moment t4 to the switch transistor $Q_{35}$. In this case, the circuit status shown in FIG. 10 may also be formed for the powertrain. In other words, for example, the switch transistor $Q_{31}$, the switch transistor $Q_{33}$, and the switch transistor $Q_{35}$ are turned off, and the switch transistor $Q_{32}$, the switch transistor $Q_{34}$, and the switch transistor $Q_{36}$ are turned on. In the circuit status, $I_{U3}+I_{V3}+I_{W3}=0$, and the motor M3 outputs torque.

Optionally, in some implementations, different from that the motor M3 outputs torque and that the power battery BAT3 is in a charging state, the power battery BAT3 in this embodiment discharges, and the motor M3 outputs torque.

In an implementation, the controller may determine at least one first bridge arm from the three bridge arms and subtract a preset target value $V_2$ from a second modulation signal of each first bridge arm, to obtain a first modulation signal of each first bridge arm. The preset target value $V_2$ is determined by the controller based on a voltage of the power battery BAT3 and the bus voltage. For example, the preset target value $V_2$ is a ratio of the voltage of the power battery BAT3 to the bus voltage.

In FIG. 14, an example in which the three bridge arms include one first bridge arm is used, and a bridge arm formed by connecting the switch transistor $Q_{31}$ and the switch transistor $Q_{32}$ in series is the first bridge arm. It can be understood from FIG. 14 that, compared with an amplitude of the second modulation signal $V_{U3B}$ prior to the moment t4, an amplitude of a first modulation signal $V_{U3A}$ subsequent to the moment t4 is decreased by the preset target value $V_2$. In other words, the preset target value $V_2$ is used as a negative bias voltage, and the controller may subtract the preset target value $V_2$ from the second modulation signal $V_{U3B}$, to obtain the first modulation signal $V_{U3A}$.

In this case, the controller compares the first modulation signal $V_{U3A}$ with the preset reference signal, to generate a PWM1_$Q_{31}$ signal (that is, a first PWM signal of a first bridge arm on which the switch transistor $Q_{31}$ is located) subsequent to the moment t4. A duty cycle of the PWM1_$Q_{31}$ signal subsequent to the moment t4 may be less than a duty cycle of the PWM1_$Q_{31}$ signal subsequent to the moment t4. The controller may subtract the preset target value $V_2$ from the second modulation signal $V_{U3B}$ and a duty cycle of a control signal of the switch transistor $Q_{31}$ may be decreased.

For bridge arms other than the first bridge arm, modulation signals prior to the moment t4 are still used. The second modulation signal $V_{V3B}$ and the second modulation signal $V_{W3B}$ may still be used. Therefore, duty cycles of the PWM1_$Q_{33}$ signal and the PWM1_$Q_{35}$ signal prior to and subsequent to the moment t4 do not change.

The controller sends the PWM1_$Q_{31}$ signal subsequent to the moment t4 to the switch transistor $Q_{31}$, sends the PWM1_$Q_{33}$ signal subsequent to the moment t4 to the switch transistor $Q_{33}$, and sends the PWM1_$Q_{35}$ signal subsequent to the moment t4 to the switch transistor $Q_{35}$. In this case, the motor M3 outputs torque, and the power battery BAT3 is in a discharging state. In other words, the power battery BAT3 and the bus capacitor unit (for example, the capacitor $C_{31}$) jointly provide a driving voltage for the motor M3. In this case, the first bridge arm and a motor winding corresponding to the first bridge arm may ensure a function of an electric drive system of the motor, and may implement a function of a DC/AC converter. In addition, the first bridge arm and the motor winding corresponding to the first bridge arm may implement a function of a DC/DC converter, and implement a voltage step-up function in the DC/DC converter, such as implementing a function of a boost converter.

Figure 15A:
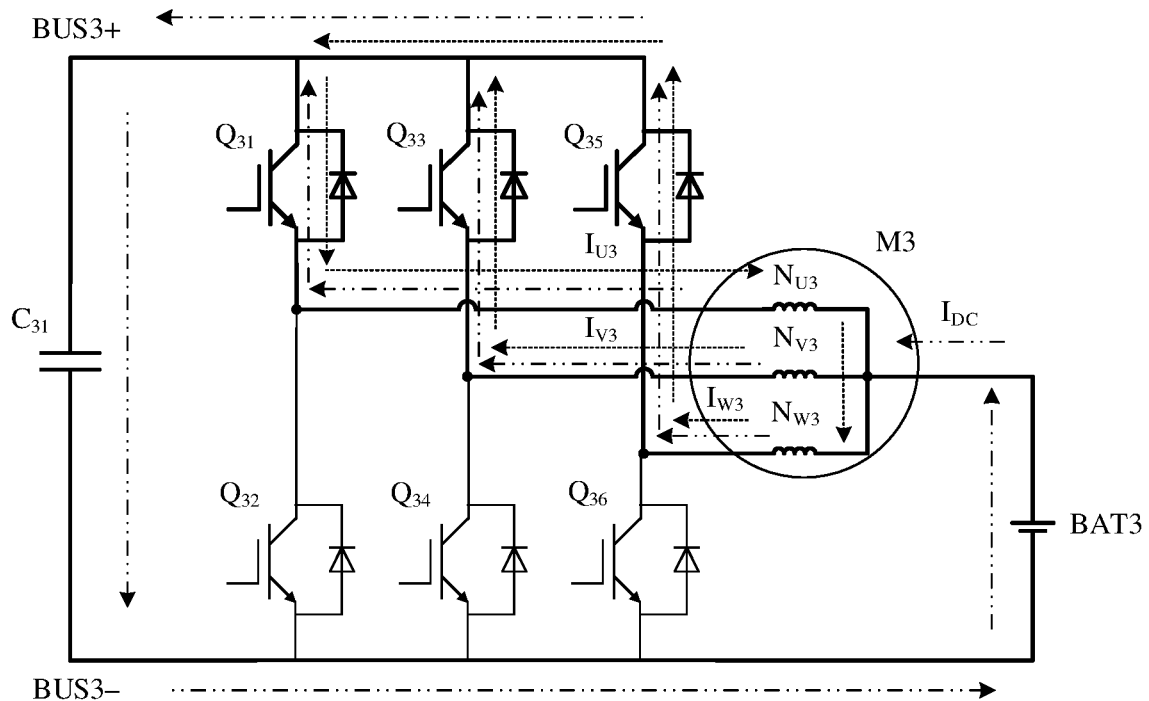
FIG. 15A and FIG. 15B each are a schematic diagram of still another circuit status according to an embodiment.

For example, in a time period from the moment t4 to a moment t5, the PWM1_$Q_{31}$ signal, the PWM1_$Q_{33}$ signal, and the PWM1_$Q_{35}$ signal are all at a high level. The switch transistor $Q_{31}$, the switch transistor $Q_{33}$, and the switch transistor $Q_{35}$ may be turned on and the switch transistor $Q_{32}$, the switch transistor $Q_{34}$, and the switch transistor $Q_{36}$ may be turned off. A circuit status shown in FIG. 15A may be formed for the powertrain. As shown in FIG. 15A, it is assumed that inductive reactances of the three motor windings are the same. Therefore, a current flowing through the motor winding $N_{U3}$ is $I_{U3}+I_{DC}/3$, a current flowing through the motor winding $N_{V3}$ is $I_{V3}+I_{DC}/3$, and a current flowing through the motor winding $N_{W3}$ is $I_{W3}+I_{DC}/3$, where $I_{U3}+I_{V3}+I_{W3}=0$. In this case, the motor M3 outputs torque. In addition, the power battery BAT3 discharges through the motor winding $N_{U3}$, the motor winding $N_{V3}$, and the motor winding $N_{W3}$. In other words, the power battery BAT3 is in a discharging state, where a discharging current is $I_{DC}$. It may be understood that, in this case, a generator and the power battery drive the motor simultaneously. A GCU connected to the generator may convert a voltage output by the generator to obtain a second voltage and the MCU may drive, based on the second voltage and the voltage of the power battery, the motor to output torque.

Figure 15B:
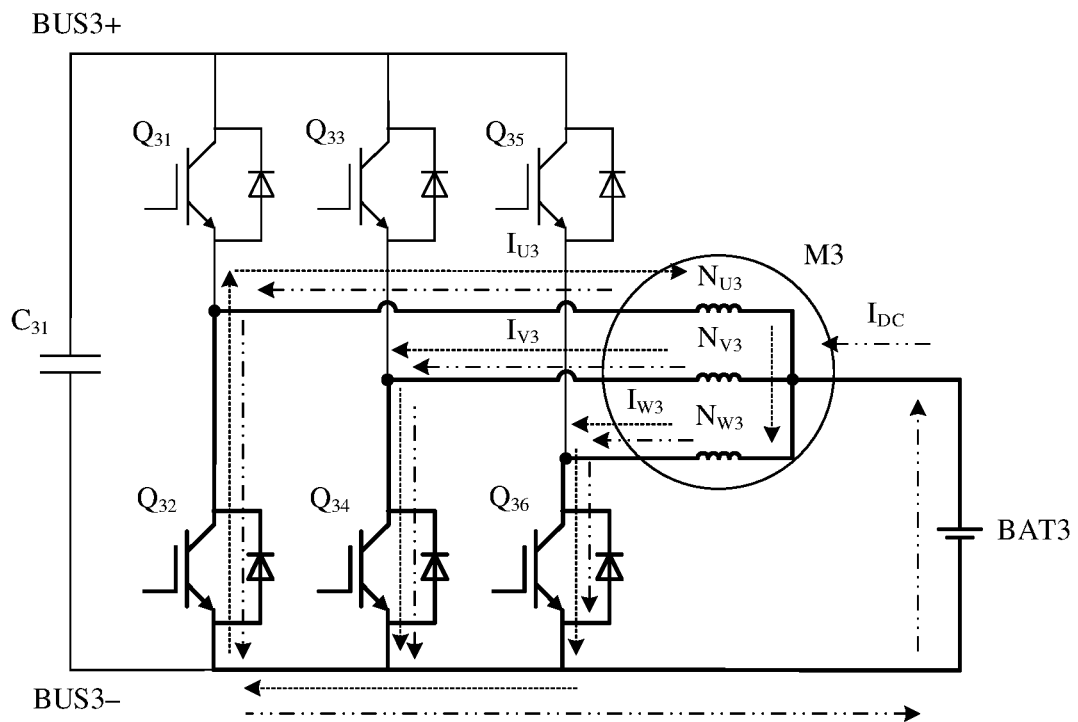

In a time period from a moment t6 to a moment t7, the PWM1_$Q_{31}$ signal, the PWM1_$Q_{33}$ signal, and the PWM1_$Q_{35}$ signal are all at a low level. In other words, the switch transistor $Q_{31}$, the switch transistor $Q_{33}$, and the switch transistor $Q_{35}$ are turned off, and the switch transistor $Q_{32}$, the switch transistor $Q_{34}$, and the switch transistor $Q_{36}$ are turned on. A circuit status shown in FIG. 15B may be formed for the powertrain. As shown in FIG. 15B, the currents of the motor windings cannot change abruptly, and the currents flowing through the three motor windings are still the currents that flow in the circuit status shown in FIG. 15A. The current flowing through the motor winding $N_{U3}$ may be $I_{U3}+I_{DC}/3$, the current flowing through the motor winding $N_{V3}$ is $I_{V3}+I_{DC}/3$, and the current flowing through the motor winding $N_{W3}$ may be $I_{W3}+I_{DC}/3$, where $I_{U3}+I_{V3}+I_{W3}=0$. In this case, the motor M3 outputs torque, and the three motor windings are in an energy storage stage.

The controller may directly send the PWM1_$Q_{31}$ signal, the PWM1_$Q_{33}$ signal, and the PWM1_$Q_{35}$ signal that are subsequent to the moment t4. Alternatively, the PWM1_$Q_{31}$ signal, the PWM1_$Q_{33}$ signal, and the PWM1_$Q_{35}$ signal that are prior to the moment t4 are directly sent. In other words, signals prior to the moment t4 and signals subsequent to the moment t4 may exist relatively independently.

Optionally, in some implementations, the controller may determine, based on a rotation speed of the motor and a battery level of the power battery, a control signal to be sent to each bridge arm. For example, if it is detected that the rotational speed of the motor is greater than a preset speed and the voltage at both ends of the power battery is greater than a preset discharging threshold, the controller sends the PWM1_$Q_{31}$ signal subsequent to the moment t4 to the switch transistor $Q_{31}$, sends the PWM1_$Q_{33}$ signal subsequent to the moment t4 to the switch transistor $Q_{33}$, and sends the PWM1_$Q_{35}$ signal subsequent to the moment t4 to the switch transistor $Q_{35}$.

In conclusion, the preset target value $V_2$ is subtracted from the second modulation signal of one first bridge arm of the three bridge arms. In other words, one of the three bridge arms is reused for discharging control of the power battery.

In this embodiment, a time for turning on and turning off the switch transistors corresponding to the first bridge arm is changed, so that the motor outputs torque while the power battery discharges. In other words, the powertrain may implement both a function of the boost converter and a function of the DC/AC converter.

Figure 16:
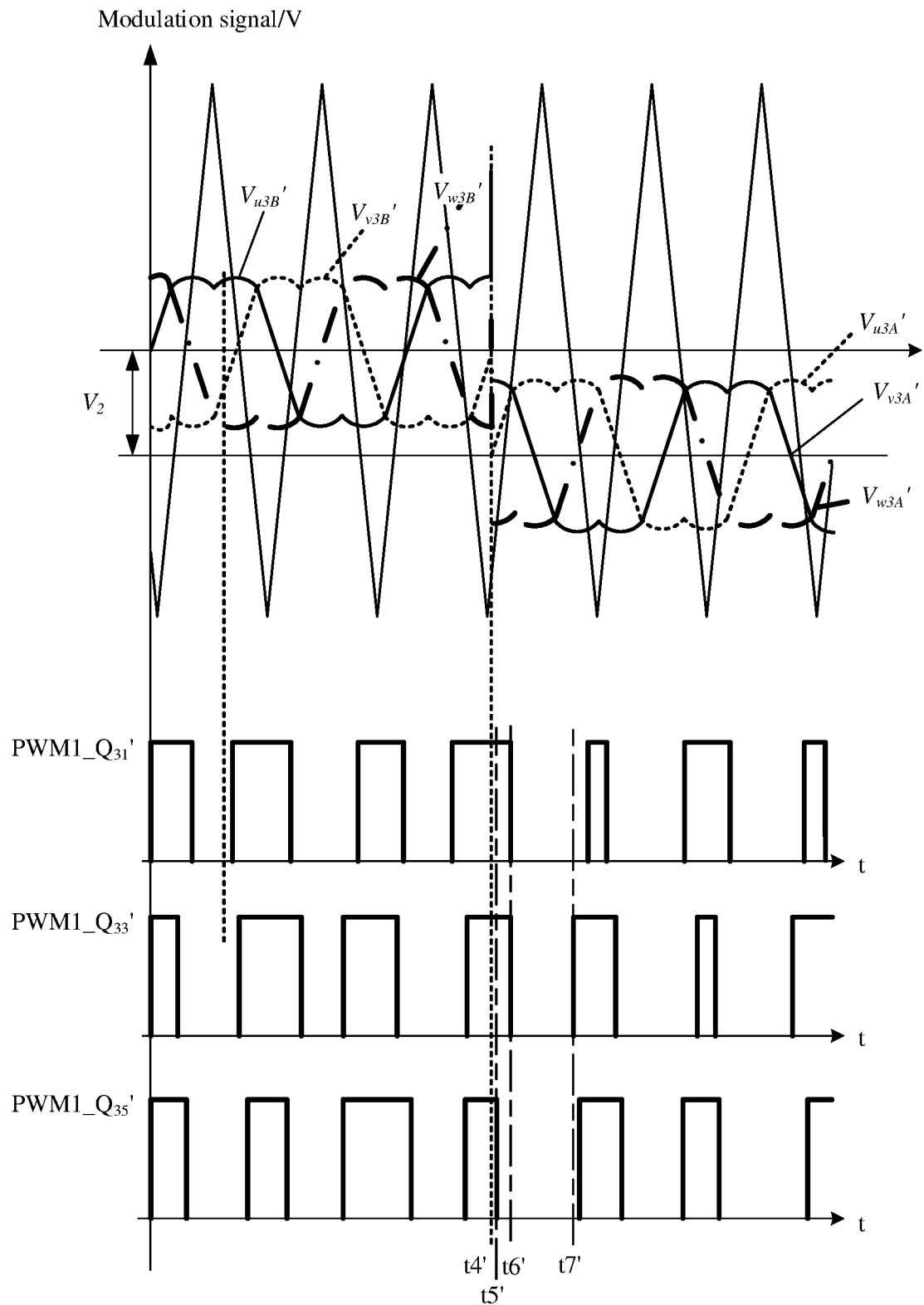
FIG. 16 is a schematic diagram of still another waveform according to an embodiment.

Optionally, in some implementations, reference may be made to FIG. 16. FIG. 16 is a schematic diagram of still another waveform according to an embodiment. As shown in FIG. 16, a controller may determine a second modulation signal, for example, a second modulation signal $V_{U3B}'$, a second modulation signal $V_{V3B}'$, and a second modulation signal $V_{W3B}'$, of each bridge arm based on a working parameter of a motor and a bus voltage.

The controller generates, based on a result of comparison of the second modulation signal $V_{U3B}'$ and a preset reference signal, a PWM1_$Q_{31}'$ signal prior to a moment t4'. The controller generates, based on a result of comparison of the second modulation signal $V_{V3B}'$ and the preset reference signal, a PWM1_$Q_{33}'$ signal prior to the moment t4'. The controller generates, based on a result of comparison of the second modulation signal $V_{W3B}'$ and the preset reference signal, a PWM1_$Q_{35}'$ signal prior to the moment t4'.

The controller sends the PWM1_$Q_{31}'$ signal prior to the moment t4' to the switch transistors $Q_{31}$, sends the PWM1_$Q_{33}'$ signal prior to the moment t4' to the switch transistors $Q_{33}$, and sends the PWM1_$Q_{35}'$ signal prior to the moment t4' to the switch transistors $Q_{35}$. In this case, the circuit status shown in FIG. 10 may also be formed for the powertrain. In the circuit status, $I_{U3}+I_{V3}+I_{W3}=0$, and the motor M3 outputs torque.

Optionally, in some implementations, the controller may use the three bridge arms as three first bridge arms respectively; therefore, the controller subtracts the preset target value $V_2$ from a second modulation signal of each first bridge arm, to obtain a first modulation signal of each first bridge arm.

In this case, the controller subtracts the preset target value $V_2$ from the second modulation signal $V_{U3B}'$ to obtain a first modulation signal $V_{U3A}'$, subtracts the preset target value $V_2$ from the second modulation signal $V_{V3B}'$ to obtain a first modulation signal $V_{V3A}'$, and subtracts the preset target value $V_2$ from the second modulation signal $V_{W3B}'$ to obtain a first modulation signal $V_{W3A}'$.

The controller compares the first modulation signal $V_{U3A}'$ with the preset reference signal, to generate a PWM1_$Q_{31}'$ signal (that is, a first PWM signal of a first bridge arm on which the switch transistor $Q_{31}$ is located) subsequent to the moment t4'. A duty cycle of the PWM1_$Q_{31}'$, signal subsequent to the moment t4' may be less than a duty cycle of the PWM1_$Q_{31}'$ signal prior to the moment t4'.

Similarly, the controller compares the first modulation signal $V_{V3A}'$ with the preset reference signal, to generate a PWM1_$Q_{33}'$ signal (that is, a first PWM signal of a first bridge arm on which the switch transistor $Q_{33}$ is located) subsequent to the moment t4'. A duty cycle of the PWM1_$Q_{33}'$ signal subsequent to the moment t4' is less than a duty cycle of the PWM1_$Q_{33}'$ signal prior to the moment t4'.

The controller compares the first modulation signal $V_{W3A}'$ with the preset reference signal, to generate a PWM1_$Q_{35}'$ signal (that is, a first PWM signal of a first bridge arm on which the switch transistor $Q_{35}$ is located) subsequent to the moment t4'. A duty cycle of the PWM1_$Q_{35}'$ signal subsequent to the moment t4' is less than a duty cycle of the PWM1_$Q_{35}'$ signal prior to the moment t4'.

The controller sends the PWM1_$Q_{31}$' signal subsequent to the moment t4' to the switch transistors $Q_{31}$, sends the PWM1_$Q_{33}$' signal subsequent to the moment t4' to the switch transistors $Q_{33}$, and sends the PWM1_$Q_{35}$' signal subsequent to the moment t4' to the switch transistors $Q_{35}$. In this case, the motor M3 outputs torque, and the power battery BAT3 is in a discharging state.

For example, in a time period from the moment t4' to a moment t5', the circuit status shown in FIG. 15A may still be formed for the powertrain; and in a time period from a moment t6' to a moment t7', the circuit status shown in FIG. 15B may still be formed for the powertrain. Therefore, for a circuit status of the powertrain, reference may be made to the descriptions in FIG. 15A and FIG. 15B. Details are not described herein again.

Compared with the schematic diagram of the waveform shown in FIG. 14, the schematic diagram of the waveform shown in FIG. 16 is used by the controller to reuse three bridge arms for discharging control of the power battery. The preset target value $V_2$ of the power battery may be subtracted from the second modulation signal of each of the three bridge arms, and the effect of embodiments described above with reference to FIG. 14 to FIG. 15B can still be implemented. In addition, in this embodiment, the three bridge arms are reused, so that current equalization can be performed among the three bridge arms.

Optionally, in some implementations, the preset target value $V_2$ may be subtracted from second modulation signals of two of the three bridge arms (this is not shown in the figure). In other words, the two bridge arms may be reused for discharging control of the power battery. In this case, circuit statuses in FIG. 15A and FIG. 15B may still be formed, the motor outputs torque, and the power battery BAT3 is in a discharging state.

Optionally, in some implementations, the motor may not output torque, and the power battery is in a discharging state. For example, in this case, the power battery outputs a voltage between the positive bus BUS3+ and the negative bus BUS5−. For example, the powertrain includes a generator. In this case, the power battery may provide power for the generator, and the generator drives an internal combustion engine to ignite in a rotation process, so that the generator is started to convert mechanical energy into electrical energy.

In this case, the controller may determine at least one second bridge arm from the three bridge arms of the MCU and may determine a second PWM signal of each second bridge arm based on the bus voltage and a voltage of the power battery BAT3.

It may be understood that, for an implementation in which the controller may determine the second PWM signal based on the bus voltage and the voltage of the power battery BAT3, reference may be made to an existing manner of determining a control signal of a switch transistor in a boost converter. Details are not described herein again.

Figure 17A:
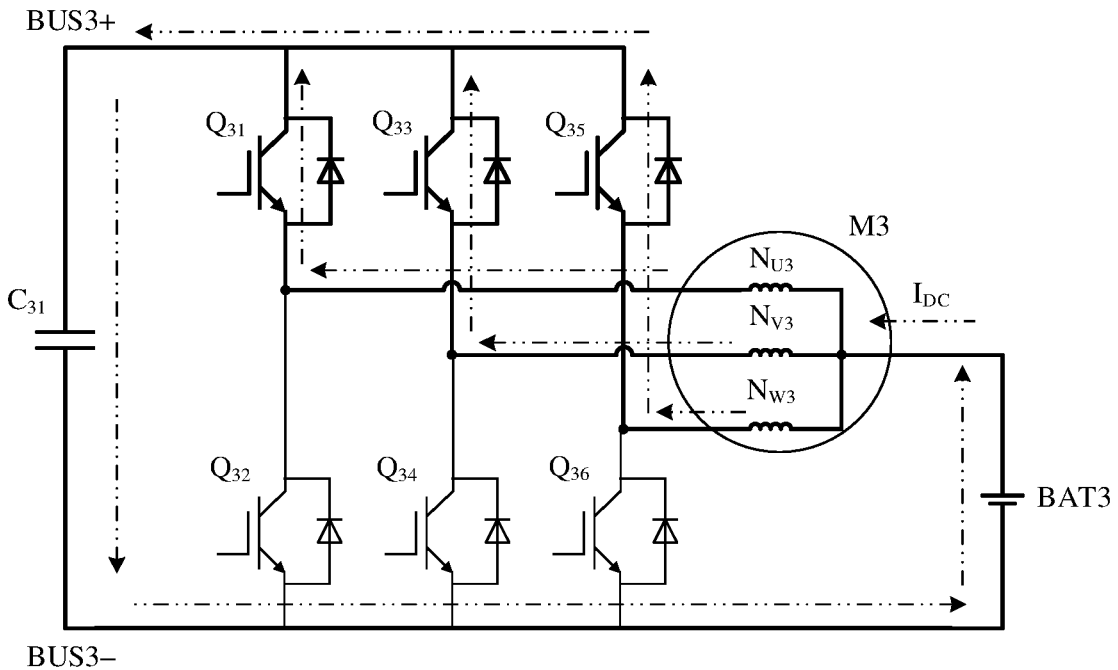
FIG. 17A and FIG. 17B each are a schematic diagram of still another circuit status according to an embodiment.
Figure 17B:
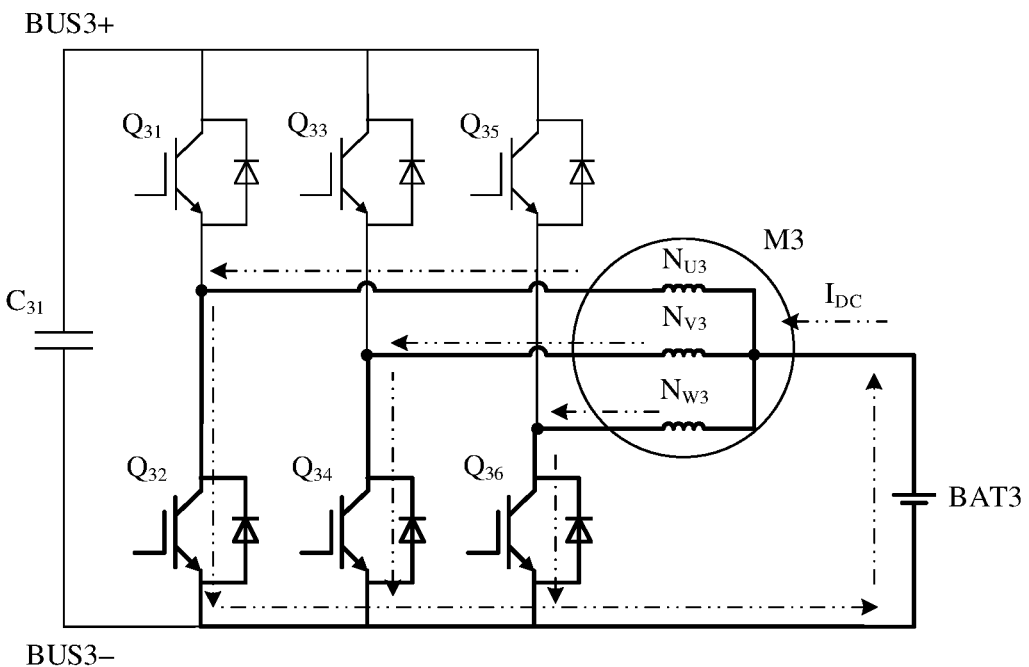

The power battery BAT3 discharges. In other words, the power battery BAT3 outputs a voltage to a bus. That the power battery BAT3 outputs the voltage to the bus may be divided into an energy storage stage of motor windings and a power battery discharging stage. In FIG. 17A and FIG. 17B, an example in which the three bridge arms are respectively used as three second bridge arms may be used. In a circuit status shown in FIG. 17A, the switch transistor $Q_{31}$, the switch transistor $Q_{33}$, and the switch transistor $Q_{35}$ are turned on, and the switch transistor $Q_{32}$, the switch transistor $Q_{34}$, and the switch transistor $Q_{36}$ are turned off. In this case, the power battery BAT3 discharges through the motor winding $N_{U3}$, the power battery BAT3 discharges through the motor winding $N_{V3}$, and the power battery BAT3 discharges through the motor winding $N_{W3}$. In this case, the MCU converts a voltage of the power battery BAT3 to obtain a fourth voltage, and outputs the fourth voltage between the positive bus BUS3+ and the negative bus BUS3−. In this case, a GCU connected between the positive bus BUS3+ and the negative bus BUS3− may drive the generator based on the fourth voltage. In conclusion, the power battery discharges to drive the generator.

For example, the circuit status shown in FIG. 15A may be understood as a combination of the circuit status shown in FIG. 17A and the circuit status shown in FIG. 10.

In a circuit status shown in FIG. 17B, the switch transistor $Q_{31}$, the switch transistor $Q_{33}$, and the switch transistor $Q_{35}$ are turned off, and the switch transistor $Q_{32}$, the switch transistor $Q_{34}$, and the switch transistor $Q_{36}$ are turned on. In this case, the motor winding $N_{U3}$, the motor winding $N_{V3}$, and the motor winding $N_{W3}$ are in an energy storage stage. For example, the circuit status shown in FIG. 15B may be understood as a combination of the circuit status shown in FIG. 17B and the circuit status shown in FIG. 10. A current flowing through each motor winding may be a sum of a current flowing through the motor winding when the motor outputs torque and a discharging current of the power battery.

It should be noted that, the circuit statuses shown in FIG. 17A and FIG. 17B should be understood as an example. In another implementation, a function of a boost converter can be implemented by controlling only one or two of the three bridge arms.

In conclusion, in embodiments described above with reference to FIG. 10 to FIG. 17B, one end of the power battery BAT3 is a positive electrode and is connected to the motor windings, and the other end of the power battery BAT3 is a negative electrode and is connected to the negative bus BUS5−.

Optionally, in some implementations, one end of a power battery may be a negative electrode and is connected to motor windings, and the other end of the power battery may be a positive electrode and is connected to a positive bus.

Figure 18:
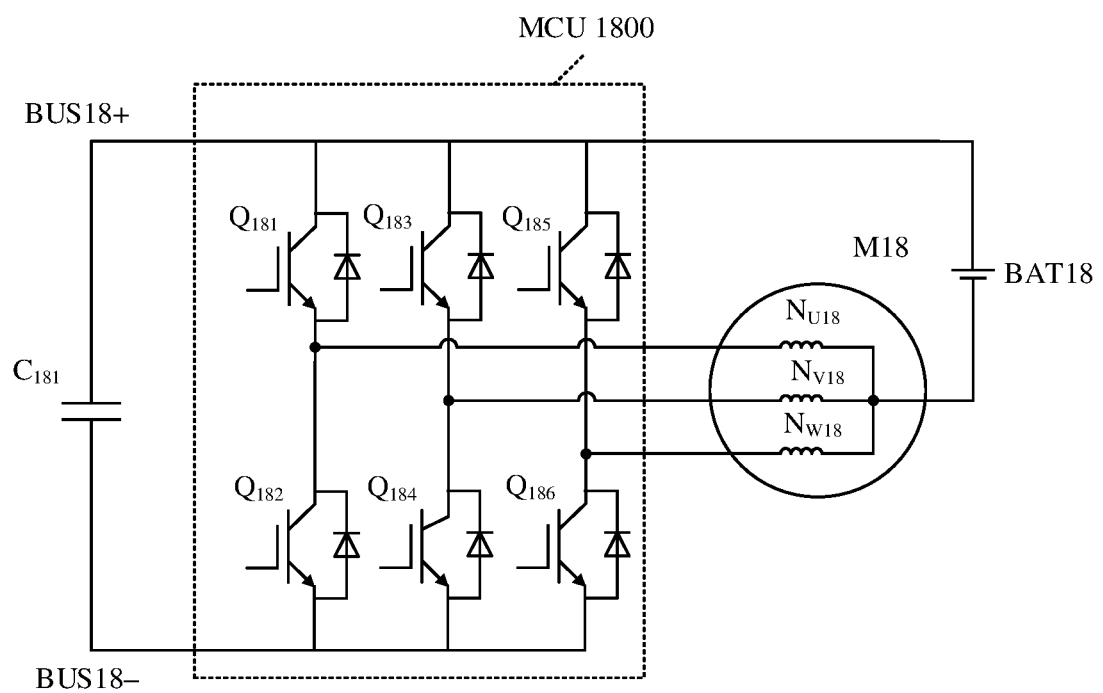
FIG. 18 is still another schematic diagram of a structure of a powertrain according to an embodiment.

In this case, for a structure of a powertrain, reference may be made to FIG. 18. As shown in FIG. 18, the powertrain provided in this embodiment includes an MCU 1800 and a motor M18. It can be understood that a difference between the powertrain in FIG. 18 and the powertrain shown with reference to FIG. 3 to FIG. 17B lies in that the other end of a power battery BAT18 is connected to a positive bus.

In this case, a first end of each of the three bridge arms is connected to a positive bus BUS18+. A collector of a switch transistor $Q_{181}$, a collector of a switch transistor $Q_{183}$, and a collector of a switch transistor $Q_{185}$ may be connected to the positive bus BUS18+. A second end of each bridge arm may be connected to a negative bus BUS18−. An emitter of a switch transistor $Q_{182}$, an emitter of a switch transistor $Q_{184}$, and an emitter of a switch transistor $Q_{186}$ may be connected to the negative bus BUS18−. A midpoint of each bridge arm may be connected to one end of one motor winding. An emitter of the switch transistor $Q_{181}$ and a collector of the switch transistor $Q_{182}$ may be connected to one end of a motor winding $N_{U18}$, an emitter of the switch transistor $Q_{183}$ and a collector of the switch transistor $Q_{184}$ may be connected to one end of a motor winding $N_{V18}$, and an emitter of the switch transistor $Q_{185}$ and a collector of the switch transistor $Q_{186}$ may be connected to one end of a motor winding $N_{W18}$.

The other end of the motor winding $N_{U18}$, the other end of the motor winding $N_{V18}$, and the other end of the motor winding $N_{W18}$ are connected to one end of the power battery BAT18, and the other end of the power battery BAT18 is connected to the positive bus BUS18+.

Similarly, the powertrain further includes a bus capacitor unit (for example, a capacitor $C_{181}$) connected between the positive bus BUS18+ and the negative bus BUS18−.

Figure 19:
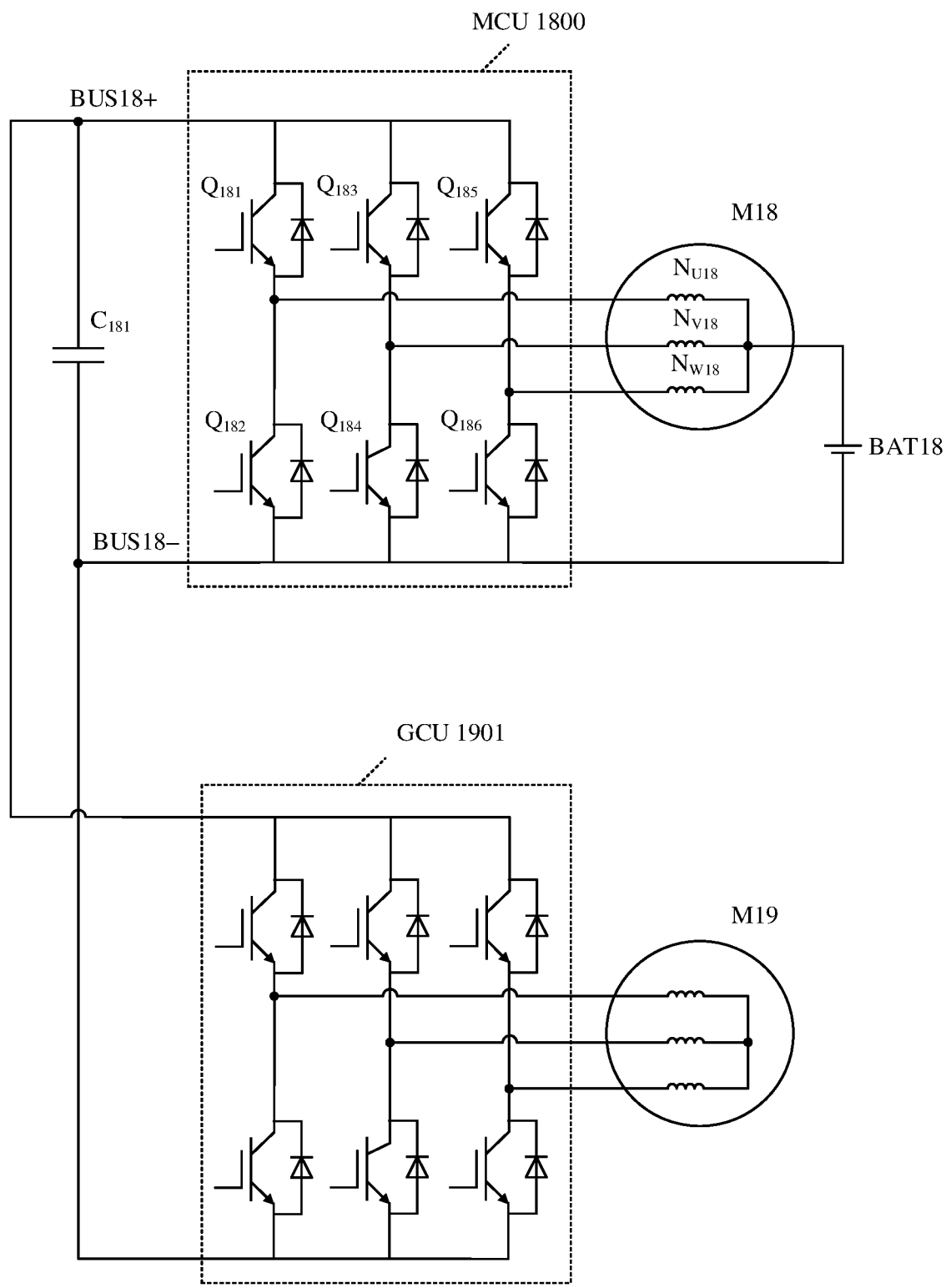
FIG. 19 is still another schematic diagram of a structure of a powertrain according to an embodiment.

Optionally, a power generation module may be added to the powertrain shown in FIG. 18, to obtain a powertrain shown in FIG. 19. In this case, in addition to the MCU 1800 and the motor M18 described with reference to FIG. 18, the powertrain further includes a GCU 1901 and a generator M19.

It should be explained that the MCU 1800, the motor M18, the GCU 1901, and the generator M19 may be all integrated in the powertrain. Alternatively, the MCU 1800 and the motor M18 may be integrated in the powertrain, and the GCU 1901 and the generator M19 may be separately disposed.

In an implementation, an input end of the GCU 1901 may be connected to the generator M19 and an output end of the GCU 1901 may be connected between the positive bus BUS18+ and the negative bus BUS18−. The GCU 1901 may convert an alternating current output by the generator M19 into a direct current and may output the direct current between the positive bus BUS18+ and the negative bus BUS18−.

Optionally, in some implementations, a bus voltage between the positive bus BUS18+ and the negative bus BUS18− may be provided by the generator M19 or may be jointly provided by the power battery BAT18 and the generator M19.

In this case, the schematic diagrams of the waveforms shown in FIG. 9, FIG. 12, FIG. 14, and FIG. 16 are still applicable to the structure of the powertrain in FIG. 18 and FIG. 19.

In some implementations, a controller sends a signal prior to the moment t0 shown in FIG. 9 to each bridge arm. The controller may send the PWM_$Q_{31}$ signal prior to the moment t0 to the switch transistor $Q_{181}$, may send the PWM_$Q_{33}$ signal prior to the moment t0 to the switch transistor $Q_{183}$, and may send the PWM_$Q_{35}$ signal prior to the moment t0 to the switch transistor $Q_{185}$. In this case, a sum of currents of the three motor windings of the motor M18 is zero, and the motor M18 outputs torque.

Figure 20:
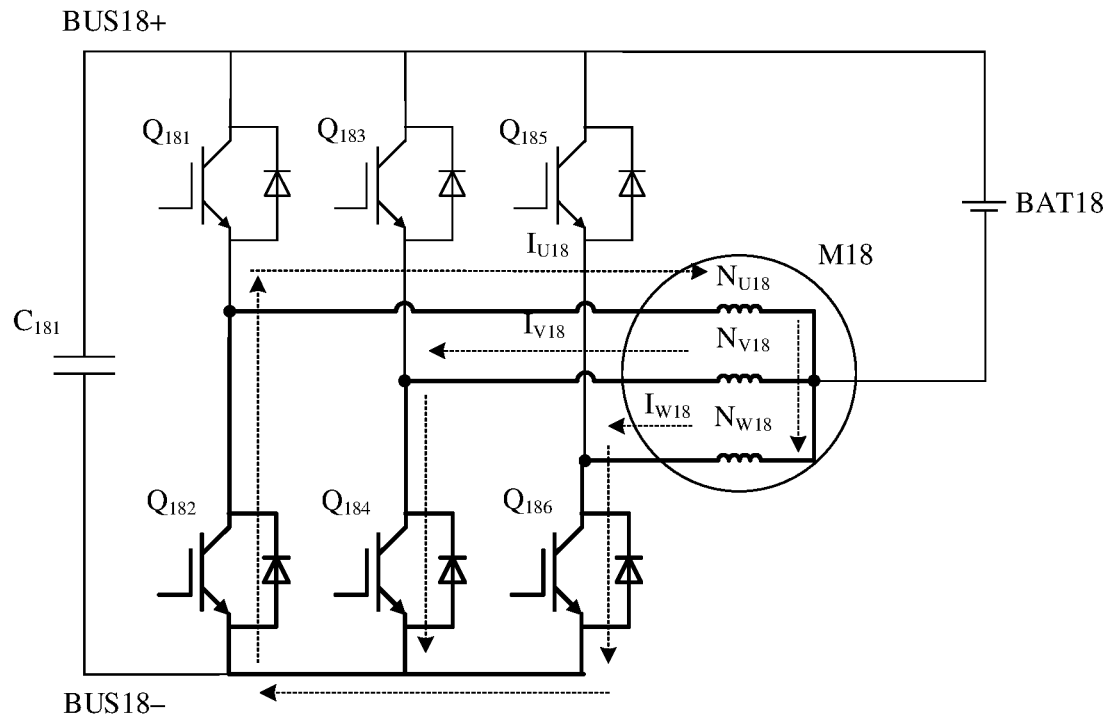
FIG. 20 is a schematic diagram of still another circuit status according to an embodiment.

For example, the switch transistor $Q_{181}$, the switch transistor $Q_{183}$, and the switch transistor $Q_{185}$ are turned off, and the switch transistor $Q_{182}$, the switch transistor $Q_{184}$, and the switch transistor $Q_{186}$ are turned on. A circuit status shown in FIG. 20 may be formed for the powertrain shown in FIG. 18. A current of the motor M18 may flow in from the motor winding $N_{U18}$, and may flow out from the motor winding $N_{V18}$ and the motor winding $N_{W18}$. In the circuit status, $I_{U18}+I_{V18}+I_{W18}=0$. In this case, the motor M18 outputs torque. In other words, the generator drives the motor M18.

Optionally, in some implementations, the controller may send a signal subsequent to the moment t0 shown in FIG. 9 to each bridge arm. The controller may send the PWM_$Q_{31}$ signal subsequent to the moment t0 to the switch transistor $Q_{181}$, may send the PWM_$Q_{33}$ signal subsequent to the moment t0 to the switch transistor $Q_{183}$, and may send the PWM_$Q_{35}$ signal subsequent to the moment t0 to the switch transistor $Q_{185}$. In this case, the motor M18 outputs torque, and the power battery BAT18 discharges. In other words, the generator and the power battery jointly drive the motor M18.

Figure 21A:
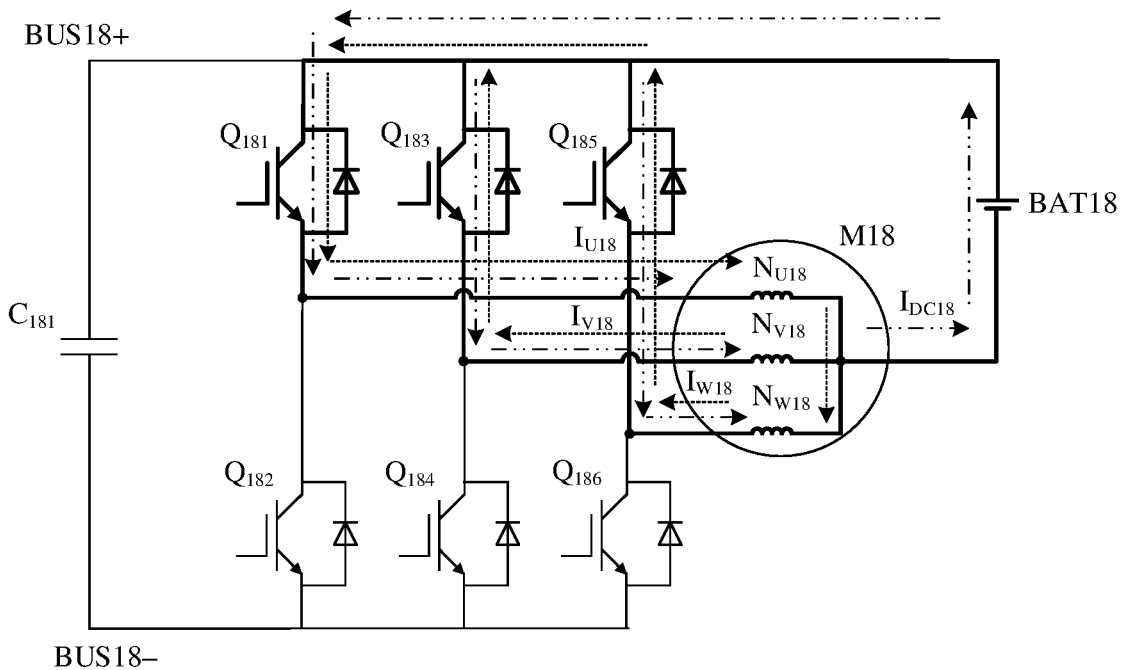
FIG. 21A and FIG. 21B each are a schematic diagram of still another circuit status according to an embodiment.

For example, in a time period from the moment t0 to the moment t1, the PWM_$Q_{31}$ signal, the PWM_$Q_{33}$ signal, and the PWM_$Q_{35}$ signal are all at a high level. The switch transistor $Q_{181}$, the switch transistor $Q_{183}$, and the switch transistor $Q_{185}$ may be turned on, and the switch transistor $Q_{182}$, the switch transistor $Q_{184}$, and the switch transistor $Q_{186}$ may be turned off. A circuit status shown in FIG. 21A may be formed for the powertrain. As shown in FIG. 21A, it is assumed that inductive reactances of the three motor windings are the same. Therefore, a current flowing through the motor winding $N_{U18}$ is $I_{U18}+I_{DC18}/3$, a current flowing through the motor winding $N_{V18}$ is $I_{V18}+I_{DC18}/3$, and a current flowing through a motor winding $N_{W18}$ is $I_{W18}+I_{DC18}/3$, where $I_{U18}+I_{V18}+I_{W18}=0$. In this case, the motor M18 outputs torque, and the three motor windings are in an energy storage stage.

Figure 21B:
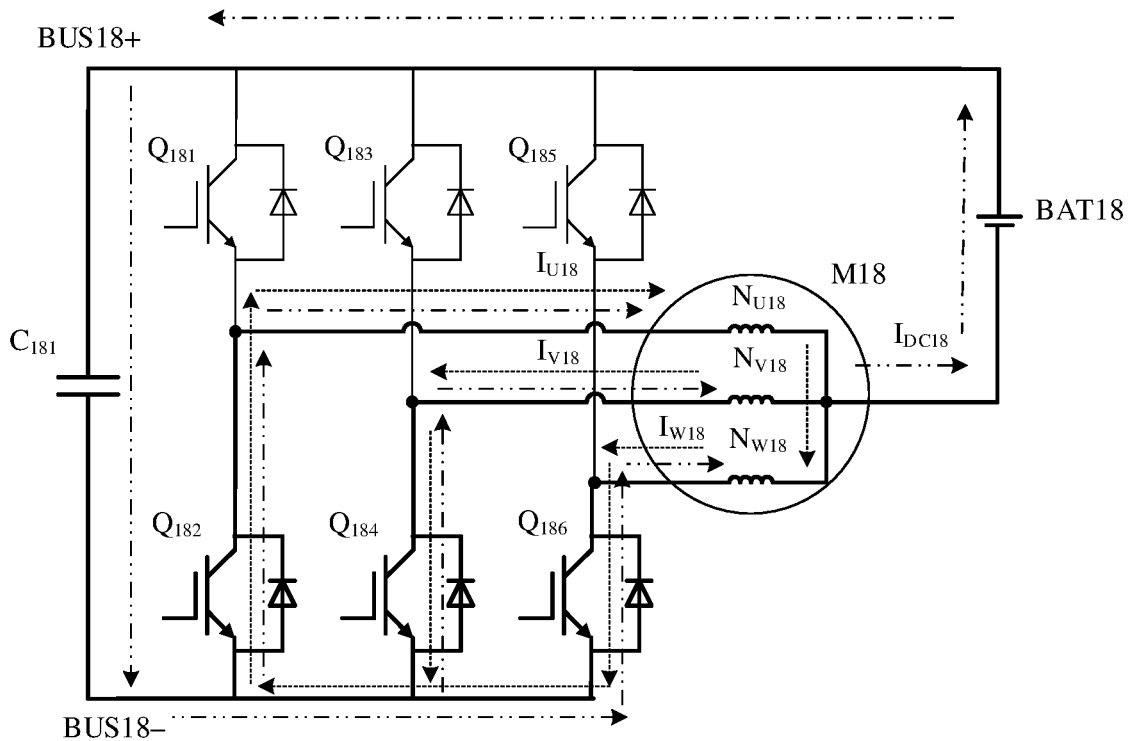

In a time period from the moment t2 to the moment t3, the PWM_$Q_{31}$ signal, the PWM_$Q_{33}$ signal, and the PWM_$Q_{35}$ signal are all at a low level. The switch transistor $Q_{181}$, the switch transistor $Q_{183}$, and the switch transistor $Q_{185}$ may be turned off, and the switch transistor $Q_{182}$, the switch transistor $Q_{184}$, and the switch transistor $Q_{186}$ may be turned on. A circuit status shown in FIG. 21B may be formed for the powertrain. As shown in FIG. 21B, the currents of the motor windings cannot change abruptly, and the currents flowing through the three motor windings are still the currents that flow in the circuit status shown in FIG. 21A. The current flowing through the motor winding $N_{U18}$ is $I_{U18}+I_{DC18}/3$, the current flowing through the motor winding $N_{V18}$ is $I_{V18}+I_{DC18}/3$, and the current flowing through the motor winding $N_{W18}$ may be $I_{W18}+I_{DC18}/3$, where $I_{U18}+I_{V18}+I_{W18}=0$. In this case, the motor M18 outputs torque. In addition, the power battery BAT18 discharges, where a discharging current is $I_{DC18}$.

Similarly, the controller sends a signal subsequent to the moment t0' shown in FIG. 12 to each bridge arm. The controller may send the PWM_$Q_{31}$' signal subsequent to the moment t0' to the switch transistor $Q_{181}$, may send the PWM_$Q_{33}$' signal subsequent to the moment t0' to the switch transistor $Q_{183}$, and may send the PWM_$Q_{35}$' signal subsequent to the moment t0' to the switch transistor $Q_{185}$.

For example, in a time period from the moment t0' to the moment t1', the circuit status shown in FIG. 21A may still be formed for the powertrain; and in a time period from the moment t1' to the moment t2', the circuit status shown in FIG. 21B may still be formed for the powertrain. Therefore, for a circuit status of the powertrain, reference may be made to the descriptions in FIG. 21A and FIG. 21B. Details are not described herein again.

Optionally, in some implementations, the controller may determine at least one second bridge arm from the three bridge arms of the MCU and may determine a second PWM signal of each second bridge arm based on a bus voltage and a voltage of the power battery BAT18. In this case, for an implementation in which the controller determines the second PWM signal based on the bus voltage and the voltage of the power battery BAT18, reference may be made to an existing manner of determining a control signal of a switch transistor in a boost converter.

Figure 22A:
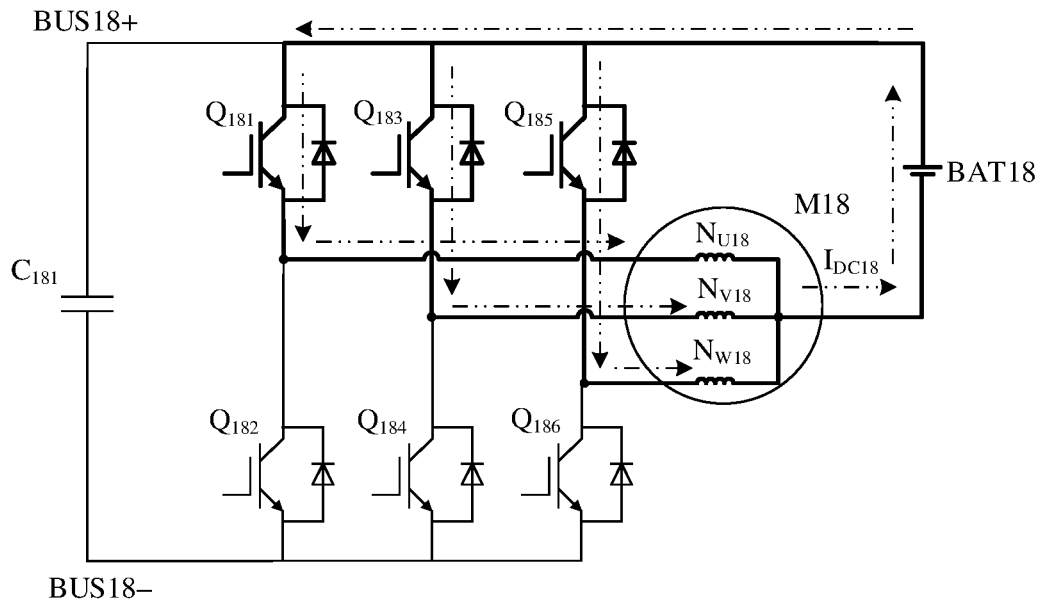
FIG. 22A and FIG. 22B each are a schematic diagram of still another circuit status according to an embodiment.
Figure 22B:
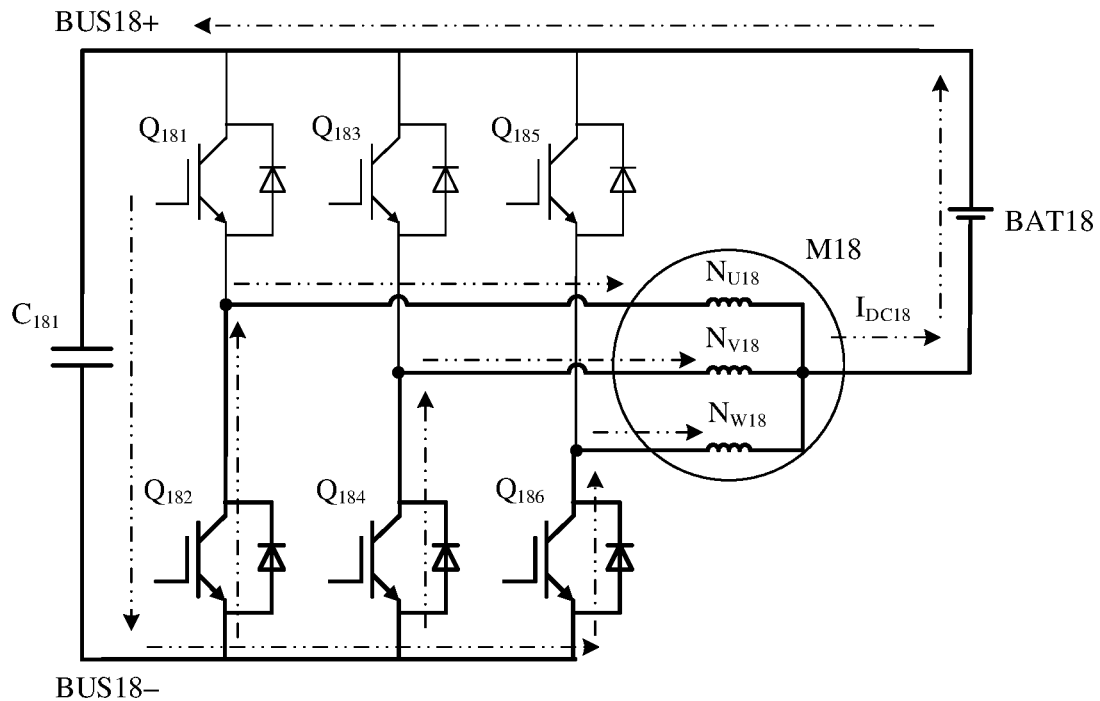

That the capacitor $C_{181}$ charges the power battery BAT18 may be divided into an energy storage phase of motor windings and a power battery charging phase. In FIG. 22A and FIG. 22B, an example in which the three bridge arms are respectively used as three second bridge arms may be used. In a circuit status shown in FIG. 22A, the switch transistor $Q_{181}$, the switch transistor $Q_{183}$, and the switch transistor $Q_{185}$ are turned on, and the switch transistor $Q_{182}$, the switch transistor $Q_{184}$, and the switch transistor $Q_{186}$ are turned off. In this case, the motor winding $N_{U18}$, the motor winding $N_{V18}$, and the motor winding $N_{W18}$ are in an energy storage stage. For example, the circuit status shown in FIG. 21A may be understood as a combination of the circuit status shown in FIG. 22A and the circuit status shown in FIG. 20.

In a circuit status shown in FIG. 22B, the switch transistor $Q_{181}$, the switch transistor $Q_{183}$, and the switch transistor $Q_{185}$ are turned off, and the switch transistor $Q_{182}$, the switch transistor $Q_{184}$, and the switch transistor $Q_{186}$ are turned off. In this case, the power battery BAT18 provides a voltage for the capacitor $C_{181}$ by using the three motor windings, that is, outputs a voltage between the positive bus BUS18+ and the negative bus BUS18−, and the motor M18 is driven by the power battery BAT18. For example, the circuit status shown in FIG. 21B may be understood as a combination of the circuit status shown in FIG. 22B and the circuit status shown in FIG. 20. A current flowing through each generator winding may be a sum of a current generated by the generator and a discharging current of the power battery.

It should be noted that, the circuit statuses shown in FIG. 22A and FIG. 22B should be understood as an example. In another implementation, a function of a boost converter can be implemented by controlling only one or two of the three bridge arms.

Optionally, in some implementations, the controller sends a signal prior to the moment t4 shown in FIG. 14 to each bridge arm. The controller may send the PWM1_$Q_{31}$ signal prior to the moment t4 to the switch transistor $Q_{181}$, may send the PWM1_$Q_{33}$ signal prior to the moment t4 to the switch transistor $Q_{183}$, and may send the PWM1_$Q_{35}$ signal prior to the moment t4 to the switch transistor $Q_{185}$. In this case, for example, the switch transistor $Q_{181}$, the switch transistor $Q_{183}$, and the switch transistor $Q_{185}$ are turned off, and the switch transistor $Q_{182}$, the switch transistor $Q_{184}$, and the switch transistor $Q_{186}$ are turned on. The circuit status shown in FIG. 20 may also be formed for the powertrain. In the circuit status, $I_{U18}+I_{V18}+I_{W18}=0$, and the motor M18 outputs torque.

Optionally, in some implementations, the controller may send a signal subsequent to the moment t4 shown in FIG. 14 to each bridge arm. The controller may send the PWM1_$Q_{31}$ signal subsequent to the moment t4 to the switch transistor $Q_{181}$, may send the PWM1_$Q_{33}$ signal subsequent to the moment t4 to the switch transistor $Q_{183}$, and may send the PWM1_$Q_{35}$ signal subsequent to the moment t4 to the switch transistor $Q_{185}$ In this case, the motor M18 outputs torque, and the power battery BAT18 is in a charging state. In other words, the generator drives the motor M18, and charges the power battery BAT18.

Figure 23A:
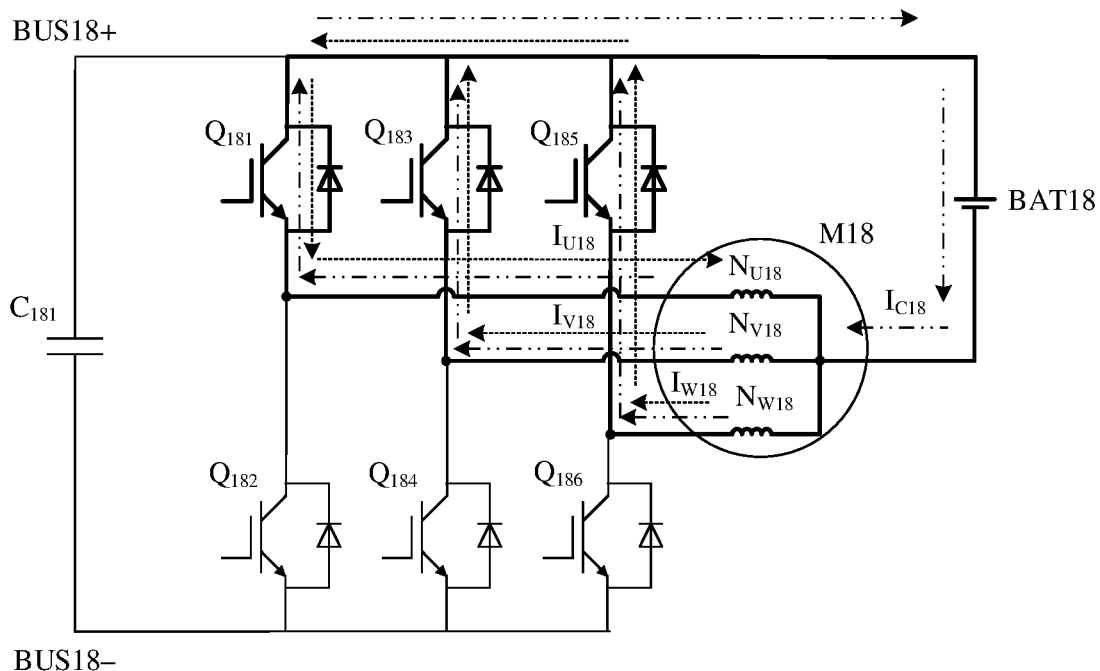
FIG. 23A and FIG. 23B each are a schematic diagram of still another circuit status according to an embodiment.

For example, in a time period from the moment t4 to the moment t5, the PWM1_$Q_{31}$ signal, the PWM1_$Q_{33}$ signal, and the PWM1_$Q_{35}$ signal are all at a high level. The switch transistor $Q_{181}$, the switch transistor $Q_{183}$, and the switch transistor $Q_{185}$ may be turned on, and the switch transistor $Q_{182}$, the switch transistor $Q_{184}$, and the switch transistor $Q_{186}$ may be turned off. A circuit status shown in FIG. 23A may be formed for the powertrain. As shown in FIG. 23A, it is assumed that inductive reactances of the three motor windings are the same. Therefore, a current flowing through the motor winding $N_{U18}$ is $I_{U18}+I_{C18}/3$, a current flowing through the motor winding $N_{V18}$ is $I_{V18}+I_{C18}/3$, and a current flowing through the motor winding $N_{W18}$ is $I_{W18}+I_{C18}/3$, where $I_{U18}+I_{V18}+I_{W18}=0$. In this case, the motor outputs torque, and the three motor windings are in an energy storage stage.

Figure 23B:
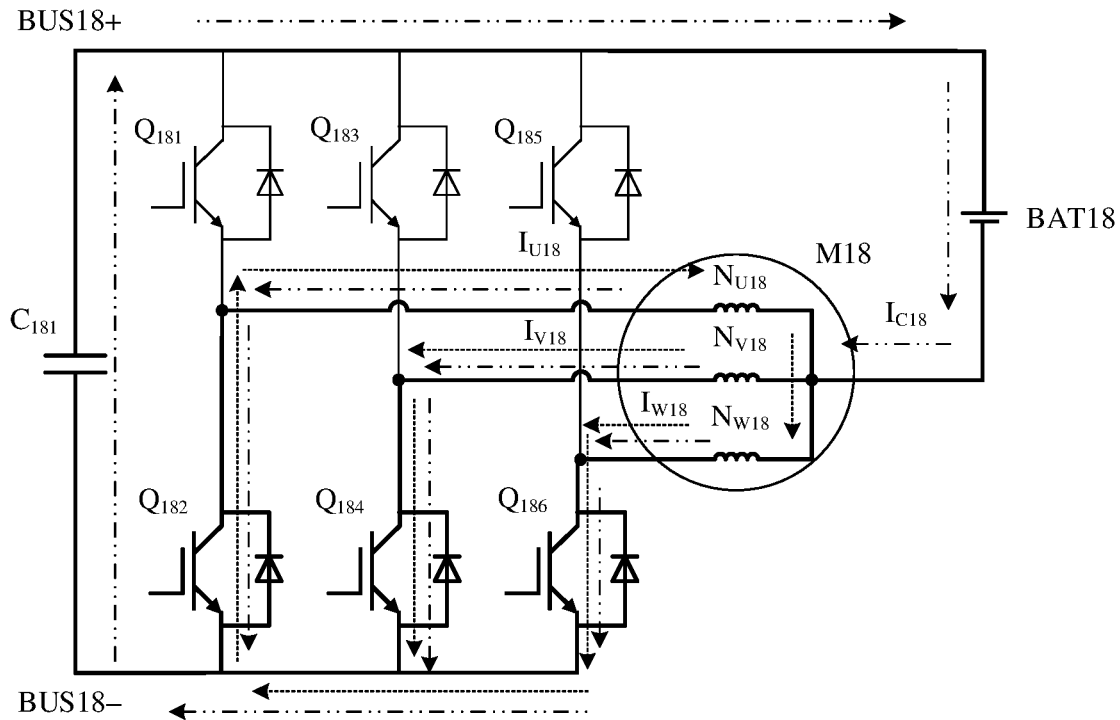

In a time period from the moment t6 to the moment t7, the PWM1_$Q_{31}$ signal, the PWM1_$Q_{33}$ signal, and the PWM1_$Q_{35}$ signal are all at a low level. The switch transistor $Q_{181}$, the switch transistor $Q_{183}$, and the switch transistor $Q_{185}$ may be turned off, and the switch transistor $Q_{182}$, the switch transistor $Q_{184}$, and the switch transistor $Q_{186}$ may be turned on. A circuit status shown in FIG. 23B may be formed for the powertrain. As shown in FIG. 23B, the currents flowing through the three motor windings are still the currents that flow in the circuit status shown in FIG. 23A. The current flowing through the motor winding $N_{U18}$ is $I_{U18}+I_{C18}/3$, the current flowing through the motor winding $N_{V18}$ is $I_{V18}+I_{C18}/3$, and the current flowing through the motor winding $N_{W18}$ may be $I_{W18}+I_{C18}/3$, where $I_{U18}+I_{V18}+I_{W18}=0$. In this case, the motor outputs torque, the motor winding $N_{U18}$ charges the power battery BAT18, the motor winding $N_{V18}$ charges the power battery BAT18, and the motor winding $N_{W18}$ charges the power battery BAT18. In other words, the power battery BAT18 is in a charging state, where a charging current is $I_{C18}$.

Similarly, the controller sends a signal subsequent to the moment t4' shown in FIG. 16 to each bridge arm. The controller may send the PWM_$Q_{31}$ signal subsequent to the moment t4' to the switch transistor $Q_{181}$, may send the PWM_$Q_{183}$ signal subsequent to the moment t4' to the switch transistor $Q_{183}$, and may send the PWM_$Q_{185}$ signal subsequent to the moment t4' to the switch transistor $Q_{185}$. For example, in a time period from the moment t4' to the moment t5', the circuit status shown in FIG. 23A may still be formed for the powertrain; and in a time period from the moment t6' to the moment t7', the circuit status shown in FIG. 23B may still be formed for the powertrain. Therefore, for a circuit status of the powertrain, reference may be made to the descriptions in FIG. 23A and FIG. 23B. Details are not described herein again.

Optionally, in some implementations, the controller may determine at least one second bridge arm from the three bridge arms of the MCU and may determine a second PWM signal of each second bridge arm based on a bus voltage and a voltage of the power battery BAT18. In this case, for an implementation in which the controller may determine the second PWM signal based on the bus voltage and the voltage of the power battery BAT18, reference may be made to an existing manner of determining a control signal of a switch transistor in a buck converter.

Figure 24A:
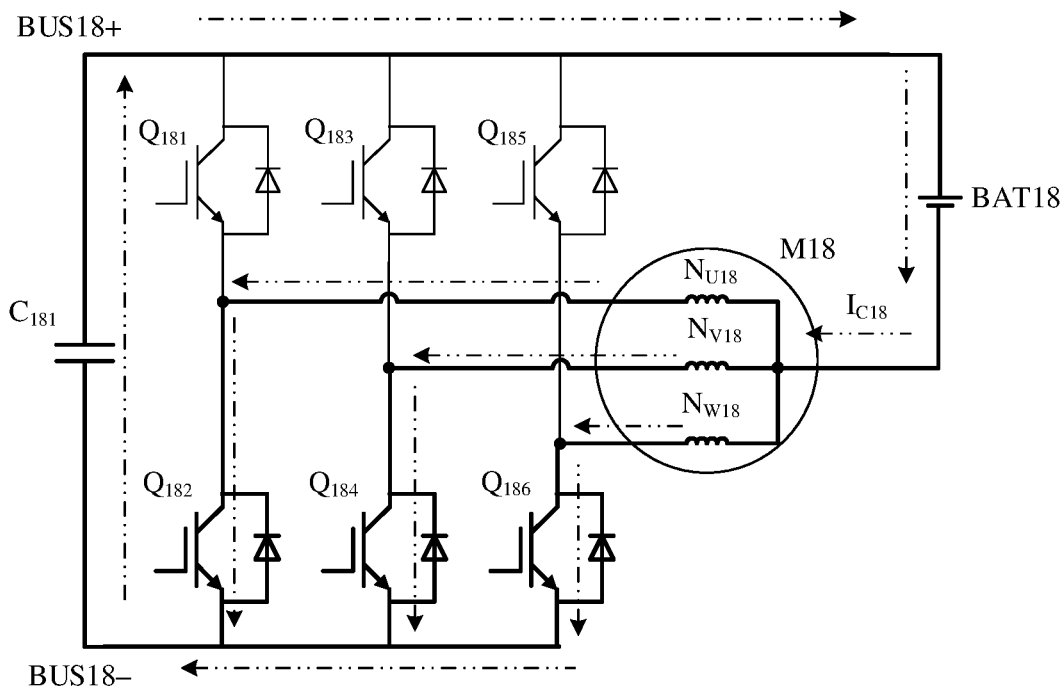
FIG. 24A and FIG. 24B each are a schematic diagram of still another circuit status according to an embodiment.
Figure 24B:
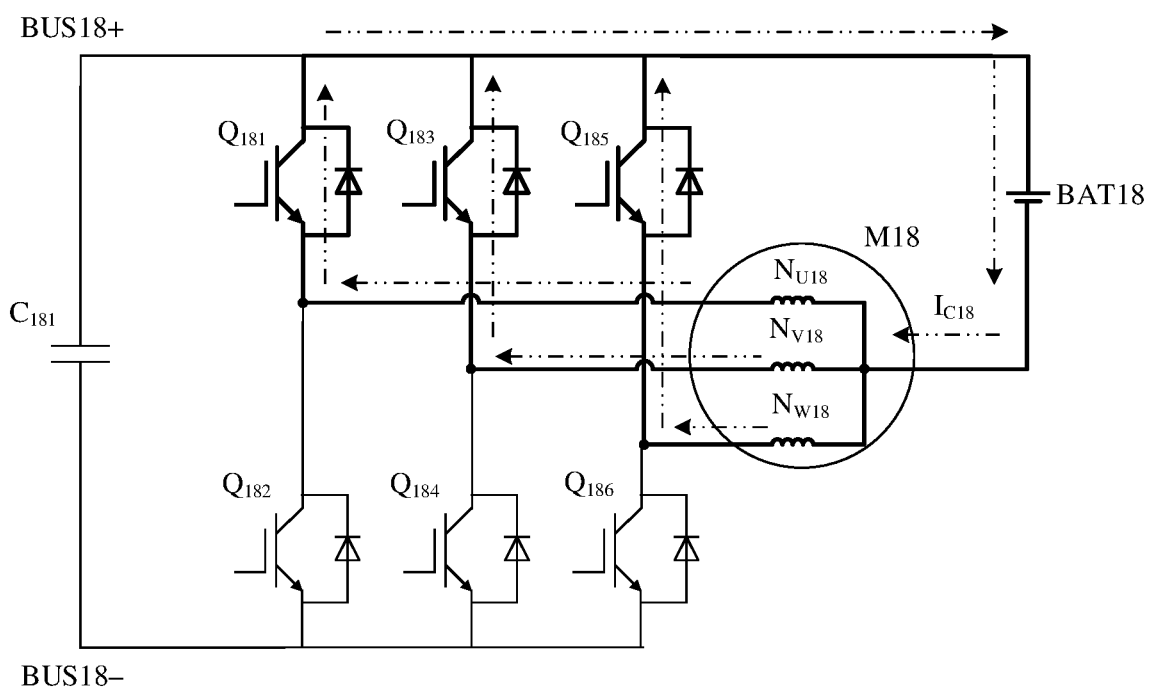

That the capacitor $C_{181}$ charges the power battery BAT18 may be divided into an energy storage phase of motor windings and a power battery charging phase. In FIG. 24A and FIG. 24B, an example in which the three bridge arms are respectively used as three second bridge arms may be used. In a circuit status shown in FIG. 24A, the switch transistor $Q_{181}$, the switch transistor $Q_{183}$, and the switch transistor $Q_{185}$ are turned off, and the switch transistor $Q_{182}$, the switch transistor $Q_{184}$, and the switch transistor $Q_{186}$ are turned on. It is assumed that inductive reactances of the three motor windings are the same. Therefore, a current flowing through the motor winding $N_{U18}$ is $I_{C18}/3$, a current flowing through the motor winding $N_{V18}$ is $I_{C18}/3$, and a current flowing through the motor winding $N_{W18}$ is $I_{C18}/3$. In this case, the motor winding $N_{U18}$ charges the power battery BAT18, the motor winding $N_{V18}$ charges the power battery BAT18, and the motor winding $N_{W18}$ charges the power battery BAT18. Therefore, a charging current of the power battery may be $I_{C18}$. In other words, the capacitor $C_{181}$ charges the power battery BAT18.

In a circuit status shown in FIG. 24B, the switch transistor $Q_{181}$, the switch transistor $Q_{183}$, and the switch transistor $Q_{185}$ are turned on, and the switch transistor $Q_{182}$, the switch transistor $Q_{184}$, and the switch transistor $Q_{186}$ are turned off. In this case, the motor winding $N_{U3}$, the motor winding $N_{V3}$, and the motor winding $N_{W3}$ are in an energy storage stage.

It may be understood that a difference between the powertrain shown in FIG. 3 to FIG. 17B and the powertrain shown in FIG. 18 to FIG. 24B lies in whether the power battery is connected to a positive bus or a negative bus. Therefore, the powertrain shown in FIG. 18 to FIG. 24B may also implement beneficial effects of embodiments described in FIG. 3 to FIG. 17B. Mutual reference may be made between the powertrain shown in FIG. 3 to FIG. 17B and the powertrain shown in FIG. 18 to FIG. 24B, and details are not described herein again.

It should be noted that the terms "first" and "second" are merely intended for a purpose of description and shall not be understood as an indication or implication of relative importance.

The foregoing descriptions are merely implementations, but are not intended as limiting. Any variation or replacement readily figured out by a person skilled in the art shall fall within the scope of the embodiments.

The invention claimed is:

1. A powertrain, the powertrain comprising: a motor controller unit (MCU) and a motor, the MCU comprises N bridge arms, and the motor comprises N motor windings corresponding to the N bridge arms, wherein N is greater than or equal to 2;
   each of the N bridge arms comprises a first end and a second end;
   the first end of each bridge arm is connected to a positive bus, the second end of each bridge arm is connected to a negative bus, and a midpoint of each bridge arm is connected to one end of one motor winding; and
   the other end of each of the N motor windings is connected to one end of a power battery, and the other end of the power battery is connected to the positive bus or the negative bus;
   a bus capacitor unit connected between the positive bus and the negative bus, wherein the MCU further comprises a controller, and the N bridge arms comprise at least one first bridge arm; and
   the at least one first bridge arm is configured to be turned on or off based on a first pulse width modulation (PWM) signal, wherein the first PWM signal is used to enable the bus capacitor unit to charge the power battery through a motor winding connected to the at least one first bridge arm;
   or the first PWM signal is used to enable the power battery to discharge through a motor winding connected to the at least one first bridge arm.

2. The powertrain according to claim 1, wherein the first PWM signal is determined by the controller based on a working parameter of the motor, a bus voltage, and a voltage of the power battery, wherein the bus voltage is a voltage between the positive bus and the negative bus.

3. The powertrain according to claim 2, wherein that the first PWM signal is determined by the controller based on a working parameter of the motor, a bus voltage, and a voltage of the power battery further comprises:
   the first PWM signal is obtained by the controller by comparing a first modulation signal with a preset reference signal, wherein
   the first modulation signal is obtained by the controller based on a second modulation signal and a preset target value; the second modulation signal is determined by the controller based on a working parameter of the motor and the bus voltage; and the preset target value is determined by the controller based on the voltage of the power battery and the bus voltage.

4. The powertrain according to claim 3, wherein when the first PWM signal is used to enable the bus capacitor unit to charge the power battery through the motor winding connected to the first bridge arm, the first modulation signal is obtained by the controller based on a second modulation signal, and a preset target value further comprises:
   the first modulation signal is a sum of the second modulation signal and the preset target value.

5. The powertrain according to claim 3, wherein, when the first PWM signal is used to enable the power battery to discharge through the motor winding connected to the first bridge arm, the first modulation signal is obtained by the controller based on a second modulation signal, and a preset target value further comprises:
   the first modulation signal is a difference between the second modulation signal and the preset target value.

6. The powertrain according to claim 1, further comprising:
   a generator control unit (GCU); and
   a generator, wherein an input end of the GCU is connected to the generator, and an output end of the GCU is connected between the positive bus and the negative bus.

7. The powertrain according to claim 6, wherein, when the first PWM signal is used to enable the bus capacitor unit to charge the power battery through the motor winding connected to the first bridge arm, the GCU is configured to convert a voltage output by the generator to obtain a first voltage; and
   the MCU is configured to drive, based on the first voltage, the motor to output torque and charge the power battery.

8. The powertrain according to claim 6, wherein, when the first PWM signal is used to enable the power battery to discharge through the motor winding connected to the first bridge arm, the GCU is configured to convert a voltage output by the generator to obtain a second voltage; and
   the MCU is configured to drive, based on the second voltage and the voltage of the power battery, the motor to output torque.

9. The powertrain according to claim 1, further comprising:
   a bus capacitor unit connected between the positive bus and the negative bus, wherein the MCU further comprises a controller, and the N bridge arms comprise at least one second bridge arm; and
   the second bridge arm is configured to be turned on or off based on a second PWM signal, wherein the second PWM signal is used to enable the bus capacitor unit to charge the power battery through a motor winding connected to the second bridge arm; or
   the second PWM signal is used to enable the power battery to discharge through a motor winding connected to the second bridge arm.

10. The powertrain according to claim 9, wherein the second PWM signal is determined by the controller based on a bus voltage and a voltage of the power battery, wherein the bus voltage is a voltage between the positive bus and the negative bus.

11. The powertrain according to claim 9, further comprising:
    a GCU; and a generator, wherein an input end of the GCU is connected to the generator, and an output end of the GCU is connected between the positive bus and the negative bus;

when the second PWM signal is used to enable the bus capacitor unit to charge the power battery through the motor winding connected to the second bridge arm, the GCU is configured to convert a voltage output by the generator to obtain a third voltage; and the MCU is configured to charge the power battery based on the third voltage.

12. The powertrain according to claim 9, further comprising:

a GCU; and a generator, wherein an input end of the GCU is connected to the generator, and an output end of the GCU is connected between the positive bus and the negative bus;

when the second PWM signal is used to enable the power battery to discharge through the motor winding connected to the second bridge arm, the MCU is configured to convert a voltage of the power battery to obtain a fourth voltage; and the GCU is configured to drive the generator based on the fourth voltage.

13. The powertrain according to claim 1, wherein each bridge arm further comprises a third end, wherein the third end of each bridge arm is connected to a neutral point of the positive bus and the negative bus, and a voltage of the neutral point is a half of the voltage between the positive bus and the negative bus.

14. A control method of a powertrain, wherein the powertrain comprises a motor controller unit (MCU), a motor, and a bus capacitor unit connected between a positive bus and a negative bus; the MCU comprises N bridge arms, the N bridge arms comprise at least one first bridge arm; and the motor comprises N motor windings corresponding to the N bridge arms, wherein N is greater than or equal to 2; and the control method comprises:

turning on or turning off the first bridge arm according to a first pulse width modulation (PWM) signal, so that the bus capacitor unit charges a power battery through a motor winding connected to the first bridge arm, or the power battery discharges through a motor winding connected to the first bridge arm.

15. The control method according to claim 14, wherein each of the N bridge arms comprises a first end and a second end, the first end of each bridge arm is connected to the positive bus, and the second end of each bridge arm is connected to the negative bus; and before the turning on or off the first bridge arm according to a first PWM signal, the control method further comprises:

determining the first PWM signal based on a working parameter of the motor, a bus voltage, and a voltage of the power battery, wherein the bus voltage is a voltage between the positive bus and the negative bus.

16. The control method according to claim 15, wherein determining the first PWM signal based on the working parameter of the motor, the bus voltage, and the voltage of the power battery further comprises:

obtaining a first modulation signal based on a second modulation signal and a preset target value; and obtaining the first PWM signal by comparing the first modulation signal with a preset reference signal, wherein the second modulation signal is determined based on a working parameter of the motor and the bus voltage, and the preset target value is determined by the controller based on the voltage of the power battery and the bus voltage.

17. The control method according to claim 16, wherein, when the first PWM signal enables the bus capacitor unit to charge the power battery through the motor winding connected to the first bridge arm, the first modulation signal is a sum of the second modulation signal and the preset target value.

18. The control method according to claim 16, wherein, when the first PWM signal is used to enable the power battery to discharge through the motor winding connected to the first bridge arm, the first modulation signal is a difference between the second modulation signal and the preset target value.

19. A hybrid electric vehicle, wherein the hybrid electric vehicle comprises a power battery and a powertrain, wherein the powertrain comprises a motor controller unit (MCU) and a motor, wherein the motor in the powertrain is connected to the power battery, the MCU comprises N bridge arms, and the motor comprises N motor windings corresponding to the N bridge arms, wherein N is greater than or equal to 2;

each of the N bridge arms comprises a first end and a second end;

the first end of each bridge arm is connected to a positive bus, the second end of each bridge arm is connected to a negative bus, and a midpoint of each bridge arm is connected to one end of one motor winding; and the other end of each of the N motor windings is connected to one end of the power battery, and the other end of the power battery is connected to the positive bus or the negative bus a bus capacitor unit connected between the positive bus and the negative bus, wherein the MCU further comprises a controller, and the N bridge arms comprise at least one first bridge arm; and the at least one first bridge arm is configured to be turned on or off based on a first pulse width modulation (PWM) signal, wherein the first PWM signal is used to enable the bus capacitor unit to charge the power battery through a motor winding connected to the at least one first bridge arm;

or the first PWM signal is used to enable the power battery to discharge through a motor winding connected to the at least one first bridge arm.

20. The hybrid electric vehicle of claim 19, wherein the power train further comprises;

a generator control unit (GCU); and a generator, wherein an input end of the GCU is connected to the generator, and an output end of the GCU is connected between the positive bus and the negative bus.

* * * * *